United States Patent
Gupta et al.

(10) Patent No.: US 11,960,517 B2
(45) Date of Patent: Apr. 16, 2024

(54) DYNAMIC CROSS-PLATFORM ASK INTERFACE AND NATURAL LANGUAGE PROCESSING MODEL

(71) Applicant: Adobe Inc., San Jose, CA (US)

(72) Inventors: Piyush Gupta, Bangalore (IN); Binit Kumar Sinha, Patna (IN); Eunyee Koh, San Jose, CA (US); Fan Du, Milpitas, CA (US); Gaurav Makkar, Hansi (IN); Silky Kedawat, Kota (IN); Subrahmanya Kumar Giliyaru, Bangalore (IN); Vasanthi Holtcamp, Fremont, CA (US); Nikhil Belsare, Foster City, CA (US)

(73) Assignee: Adobe Inc., San Jose, CA (US)

( * ) Notice: Subject to any disclaimer, the term of this patent is extended or adjusted under 35 U.S.C. 154(b) by 176 days.

(21) Appl. No.: 17/383,051

(22) Filed: Jul. 22, 2021

(65) Prior Publication Data

US 2023/0021797 A1 Jan. 26, 2023

(51) Int. Cl.
*G06F 16/33* (2019.01)
*G06F 16/338* (2019.01)
*G06F 40/40* (2020.01)

(52) U.S. Cl.
CPC ...... *G06F 16/3344* (2019.01); *G06F 16/3346* (2019.01); *G06F 16/338* (2019.01); *G06F 40/40* (2020.01)

(58) Field of Classification Search
CPC ............... G06F 16/3344; G06F 16/338; G06F 16/3346; G06F 40/40
See application file for complete search history.

(56) References Cited

U.S. PATENT DOCUMENTS

| 10,558,688 | B1 * | 2/2020 | Nguyen | G06F 16/3344 |
| 11,016,964 | B1 * | 5/2021 | Hinegardner | G06F 16/2428 |
| 2015/0317302 | A1 * | 11/2015 | Liu | G06F 40/40 704/9 |
| 2021/0089587 | A1 * | 3/2021 | Gupta | G06F 40/30 |
| 2022/0035799 | A1 * | 2/2022 | Bhutada | G06F 40/30 |

* cited by examiner

*Primary Examiner* — Mark D Featherstone
*Assistant Examiner* — Ranjit P Doraiswamy
(74) *Attorney, Agent, or Firm* — Keller Preece PLLC

(57) ABSTRACT

The present disclosure relates to systems, non-transitory computer-readable media, and methods that generate a dynamic cross-platform ask interface and utilize a cross-platform language processing model to provide platform-specific, contextually based responses to natural language digital text queries. In particular, in one or more embodiments, the disclosed systems utilize machine learning models to extract registered intents from digital text queries to identify platform-specific configurations associated with the registered intents. Utilizing the platform-specific configurations, the disclosed systems can generate tailored platform-specific requests for information, as well as customized end-user search results that cause client devices to efficiently, accurately, and flexibly render platform-specific search results.

20 Claims, 17 Drawing Sheets

DYNAMIC CROSS-PLATFORM ASK INTERFACE AND NATURAL LANGUAGE PROCESSING MODEL

BACKGROUND

Recent years have seen significant improvements in client device query systems for generating digital query responses. For example, conventional systems can utilize natural language requests to generate digital responses across computer networks. To illustrate, conventional systems can receive a natural language question from a client device (e.g., without special syntax and/or formatting). Conventional systems then match keywords and/or topics from the question to available responses and provide the available responses within a user interface.

Although conventional systems can provide responses to natural language queries, such systems have a number of problems in relation to flexibility, accuracy, and efficiency of operation. For instance, conventional systems are often rigidly restricted to platform-siloed querying. To illustrate, conventional systems analyze and respond to a received query in manner that is focused on a single platform (e.g., a database or network corresponding to a particular software platform). Thus, when a conventional system receives a query that is potentially tied to a different platform, conventional systems cannot generate an appropriate response.

Moreover, conventional systems are inaccurate. As just mentioned, conventional systems often provide inaccurate digital responses to queries that require digital information from a separate platform. In addition, conventional systems are often capable of processing queries presented in natural language by extracting keywords and generating formal queries around the extracted keywords. The keyword-based approach, however, is often riddled with ambiguity and generally ignores specific contextual meanings of words and phrases. Thus, in response to receiving a query including words with a particular meaning within a particular platform, conventional systems often provide results are that inaccurately drawn to generic contexts.

Additionally, conventional systems are inefficient. To illustrate, as mentioned above, conventional systems generally address queries and requests on a platform-by-platform basis. Accordingly, to receive and respond to a query from a first platform, conventional systems require user interfaces and user interactions with the first platform. To receive and respond to queries from other platforms, conventional systems then require additional user interfaces and additional user interactions with these other platforms. Accordingly, conventional systems waste significant computing resources in running multiple parallel software applications, generating user interfaces, processing user interactions, transmitting and processing repetitive queries, switching between applications, and storing siloed results.

These along with additional problems and issues exist with regard to conventional systems.

BRIEF SUMMARY

One or more embodiments described herein provide benefits and/or solve one or more of the foregoing or other problems in the art with systems, methods, and non-transitory computer-readable media that generate a dynamic cross-platform ask interface and utilizes a cross-platform language processing model to provide platform-specific, contextually-based responses to natural language queries. For instance, the disclosed systems utilize platform-specific configurations tailored to registered intents to generate cross-platform responses to digital text queries.

To illustrate, in response to receiving a digital text query on a first software platform, the disclosed systems utilize a cross-platform language processing model (trained to recognize and understand terminology across a variety of specific software platforms) to extract at least one intent from the digital text query and identify a platform-specific configuration corresponding to the extracted intent. Utilizing the identified platform-specific configuration, the disclosed systems generate a platform-specific request around the extracted intent according to the platform-specific configuration. Furthermore, in response to receiving a response to the platform-specific request, the disclosed systems generate a response to the digital text query that causes a client device to render the response to the platform-specific request according to the platform-specific configuration.

In this manner, the disclosed systems leverage the platform-specific configurations to generate cross-platform responses to digital text queries that include contextually relevant intents. The disclosed systems offer a wide range of actions, insights, and content/links, all accessible from a single, dynamic user interface. The disclosed systems easily and efficiently evolve with up-to-date insights from pluggable platform-specific answer models. With answers generated across various software platforms, the disclosed systems can offer data insights and recommendations based on relationships between various entities. Moreover, the disclosed systems can show different representations in response to different, platform-specific questions, configurable according to answer providers specific to each platform.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
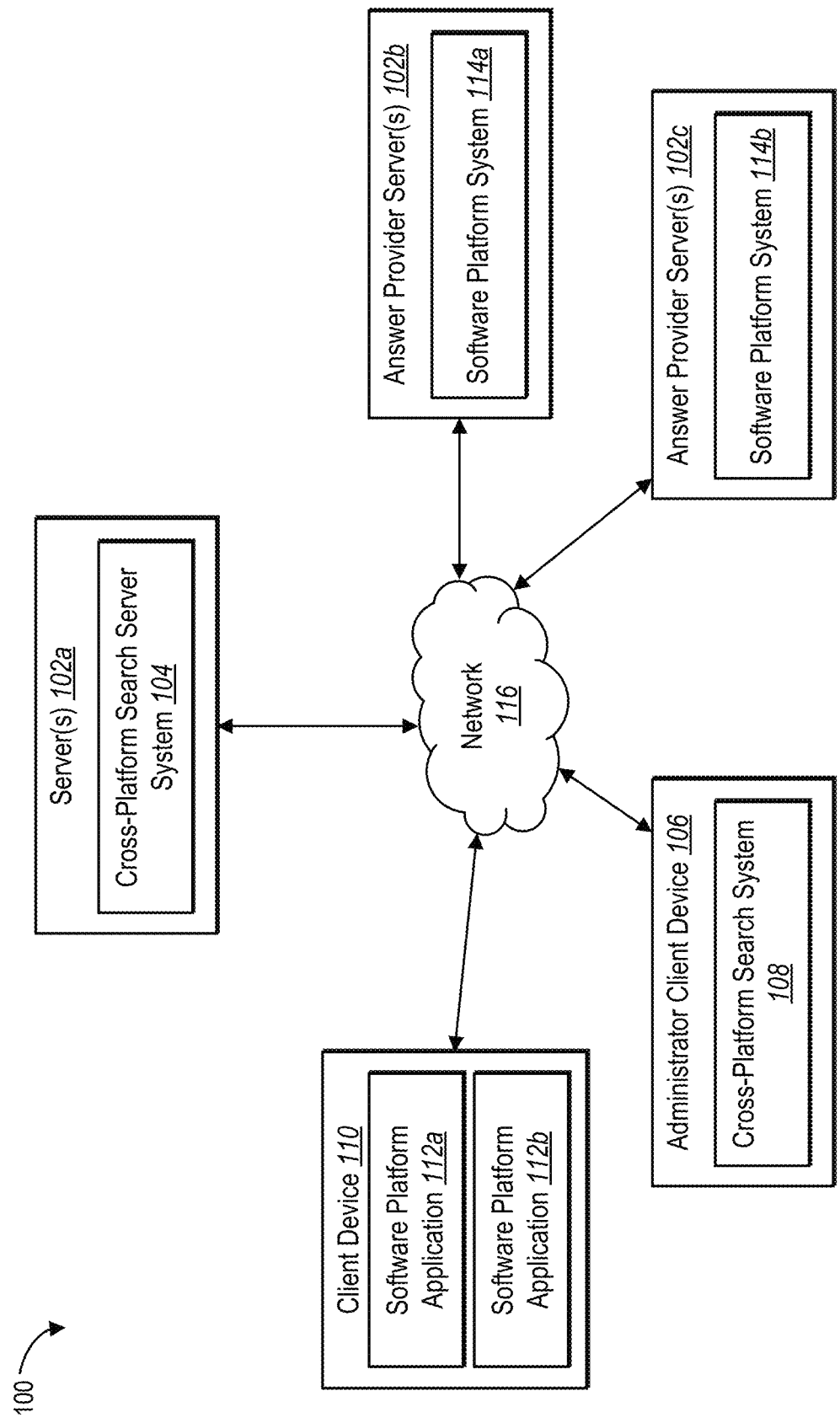
FIG. 1 illustrates a diagram of an environment in which a cross-platform search system can operate in accordance with one or more embodiments.

This disclosure describes one or more embodiments of a cross-platform search system that generates cross-platform responses to digital text queries utilizing a cross-platform natural language processing model and platform-specific configurations in connection with registered intents. More specifically, the cross-platform search system utilizes a cross-platform language processing model to intelligently extract a registered intent from a received digital text query and identify a platform-specific configuration corresponding to the registered intent. Utilizing the platform-specific configuration, the cross-platform search system generates a platform-specific request that is tailored to a particular software platform and sends the generated platform-specific request to the particular software platform. In response to receiving a response to the platform-specific request (from an answer provider model specific to the particular software platform), the cross-platform search systems further utilizes the platform-specific configuration to generate a response to the digital text query that causes a client device to render the response to the digital text query. As further discussed herein, the cross-platform search system generates a cross-platform response specific to a first software platform even after receiving the digital text query via a second software platform. In this way, the cross-platform search system flexibly and accurately provides a wide range of contextually-based platform-specific responses while improving efficiency by reducing the number of software applications, user interfaces, and user interactions processed by implementing devices.

To illustrate, the cross-platform search system generates contextually-based platform-specific responses based on platform-specific configurations. In one or more embodiments, the cross-platform search system registers multiple software platforms by receiving platform-specific configurations during an onboarding process. For example, the cross-platform search system registers the software platforms by receiving computer model training data associated with intents specified by the platform-specific configurations. For instance, in one or more embodiments, the received computer model training data including previous digital text queries for information from the individual software platforms and corresponding ground truth intents for the previous digital text queries.

In one or more embodiments, the cross-platform search system utilizes the information received from administrator client devices and/or answer provider devices in association with particular software platform systems during registration to build a cross-platform language processing model. For example, in at least one embodiment, the cross-platform search system utilizes the cross-platform language processing model to determine contextually-based intents from new digital text queries. Accordingly, the cross-platform search system builds the cross-platform language processing model utilizing the previous digital text queries and corresponding ground truth intents included in the training data. In this manner, the cross-platform language processing model can determine or extract intents from unknown digital text queries that are relevant to the registered software platforms.

In one or more embodiment, the cross-platform search system further builds the cross-platform language processing model to extract, from digital text queries, other data that is correlated to the determined intents. For example, the cross-platform search system further builds the cross-platform language processing model to extract parameter values (e.g., entities, words, terms) from digital text queries that correlate with the determined intents. In at least one embodiment, the cross-platform search system further utilizes these additionally extracted parameter values in generating platform-specific requests.

Additionally, in one or more embodiments, the cross-platform search system generates a mapping of platform-specific configurations received from one or more software platform systems. For example, to identify a platform-specific configuration associated with a particular intent extracted from a digital text query, the cross-platform search system generates a platform-specific configuration mapping by organizing received platform-specific configurations according to originating software platforms and intents included in the platform-specific configurations. In one or more embodiments, the cross-platform search system registers an intent by organizing a platform-specific configuration referencing that intent within the platform-specific configuration mapping. Moreover, the cross-platform can then build or learn parameters of the cross-platform language processing model from the training data received along with that platform-specific configuration.

As mentioned above, the cross-platform search system further receives run-time digital text queries from a dynamic user interface. For example, in one or more embodiments, the cross-platform search system receives a digital text query via a user interface of a first software platform on a client device. In at least one embodiment, the digital text query requests information specific to a second software platform. Additionally or alternatively, the digital text query requests information specific to the first software platform. Additionally or alternatively, the digital text query requests information that is not specific to any software platform (e.g., general "help" queries).

To generate response to a received digital text query, the cross-platform search system utilizes the cross-platform language processing model to determine at least one registered intent from the digital text query. As mentioned above, the cross-platform search system trains the cross-platform language processing model to determine or otherwise extract a contextually-based intent from a digital text query, where the determined intent corresponds to one or more registered intents within the platform-specific configuration mapping. In one or more embodiments, the cross-platform search system utilizes the cross-platform language processing model to generate a prediction or score indicating a likelihood that the digital text query includes an intent registered within the platform-specific configuration mapping. In response to determining that the prediction or score is within a threshold range, the cross-platform search system determines that the digital text query includes or is associated with the registered intent.

In one or more embodiments, the cross-platform search system utilizes the registered intent to select a platform-specific configuration for use in generating a platform-specific request for information responding to the digital text query. For example, in at least one embodiment, the utilizes the intent to select a platform-specific configuration specified by the platform-specific configuration mapping. For instance, as mentioned above, the cross-platform search system generates the platform-specific configuration mapping that cross-references platform-specific configurations by registered intents and software platforms.

The cross-platform search system further generates a platform-specific request utilizing the selected platform-specific configuration associated with the determined intent from the digital text query. In one or more embodiments, the platform-specific configuration includes instructions for extracting parameter values from the digital text query and utilizing the extracted parameter values to configure the platform-specific request. For instance, based on the parameters of the platform-specific configuration, the cross-platform search system extracts parameter values from the digital text query such as, but not limited to, digital object names, time frames, and other keywords. Additionally or alternatively, as mentioned above, the cross-platform search system utilizes parameter values extracted from the digital text query by the cross-platform language processing model.

In at least one embodiment, the cross-platform search system configures the platform-specific request according to the platform-specific configuration including the extracted or otherwise determined parameter values. For example, the cross-platform search system utilizes the instructions in the platform-specific configuration to format the platform-specific request including the determined parameter values in a structure or syntax corresponding to an answer provider device corresponding to a particular software platform associated with the platform-specific configuration. In one or more embodiments, the cross-platform search system generates the platform-specific request as an API call for an API server associated with the answer provider device corresponding to the software platform indicated by the platform-specific configuration.

In one or more embodiments, the cross-platform search system transmits the platform-specific request to the answer provider device corresponding to the software platform indicated by the platform-specific configuration. For example, in at least one embodiment, the cross-platform search system transmits the platform-specific request to the answer provider device corresponding to the software platform via a gateway (e.g., an API server) associated with the software platform. Additionally, in one or more embodiments, the cross-platform search system also receives a response to the platform-specific request from the answer provider device corresponding to the software platform. For instance, the cross-platform search system receives the response to the platform-specific request via the same gateway through which the platform-specific request was transmitted.

In some embodiments, the response to the platform-specific request includes data and display instructions that are not in a displayable format. Accordingly, in one or more embodiments, the cross-platform search system generates a response to the digital text query from the response to the received platform-specific request. For example, the cross-platform search system generates the response to the digital text query by packaging or formatting the received data and the display instructions such that, when transmitted to the client device, the response to the digital text query causes the client device to render the data according to the display instructions. Additionally, in at least one embodiment, the cross-platform search system further generates the response to the digital text query including a response rendition type specified by the platform-specific configuration such that the client device renders the data according to the display instructions and the response rendition type. To illustrate, the cross-platform search system can expand a search bar within a query user interface to include a response rendition canvas that displays actionable tables, charts, or lists.

Indeed, in at least one embodiment, the cross-platform search system generates the response to the digital text query such that the client device renders one or more in-place actions. For example, in response to detected interactions with at least one of the one or more in-place actions rendered by the client device, the cross-platform search system generates one or more additional platform-specific requests to initiate tasks associated with the at least one of the one or more in-place actions. The cross-platform search system then causes the client device to update the rendered response to the digital text query to reflect progress of the initiated tasks.

In one or more embodiments, the cross-platform search system collects interaction data in connection with digital text queries and rendered responses to the digital text queries to further build or learn parameters of the cross-platform language processing model. For example, the cross-platform search system collects information indicating whether rendered responses were viewed and interacted with to further enhance the accuracy of the cross-platform language processing model in connection with future digital text queries.

As mentioned above, the cross-platform search system provides various benefits over conventional systems. For example, as discussed above, conventional systems are generally limited to single-platform operations. To illustrate, in response to receiving a query, conventional systems typically generate a query response that includes data specific to the platform from which the query was received. This rigidity leads to inaccuracies and computational inefficiencies when the query is actually specific to a platform that is different from the platform where the query is received. These inaccuracies and computational inefficiencies are further compounded when the query references words and phrases that have specific, contextually-based meanings.

In contrast, the cross-platform search system leverages registered intents and platform-specific configurations to flexibly generate query responses that span multiple platforms. For example, as discussed above, the cross-platform search system is not restricted to single-platform querying. Instead, the cross-platform search system collects platform-based training data as part of registering multiple platforms, and trains a cross-platform language processing model to determine platform-specific intents from digital text queries. The cross-platform search system then utilizes the determined intents to guide further platform-specific requests and responses (e.g., by generating platform-specific requests from registered configurations uniquely tailored to individual software platform answer providers). Thus, the cross-platform search system flexibly handles digital text queries across multiple platforms.

Additionally, the cross-platform search system avoids the inaccuracies common to general keyword-based querying. For example, the cross-platform search system utilizes the a cross-platform language processing model to determine intents that have specific contextual meanings within the registered software platforms. Thus, rather than returning inaccurate query results that are drawn to potentially ambiguous keywords, the cross-platform search system generates query responses that are specific to words and phrases that have unique contextual meaning within the registered software platforms.

Moreover, the flexibility and accuracy of the cross-platform search system generates a variety of computational efficiencies. For example, the cross-platform search system makes efficient use of computing resources in providing a single query interface through which cross-platform digital text queries can be received and addressed—regardless of the software platform in which the query interface is implemented. As such, the cross-platform search system reduces computational expenditures associated with activating additional software platforms, generating additional user interfaces, processing duplicative user interactions, and storing additional intermediate data objects.

As illustrated by the foregoing discussion, the present disclosure utilizes a variety of terms to describe features and advantages of the cross-platform search system. Additional detail is now provided regarding the meaning of such terms. As used herein, the term "software platform" (or sometimes "platform" or "software platform system") refers to a computer-implemented program, application, or product. For example, a software platform can include a computing application that includes interface builders, event listeners, data managers, and other analysis tools that operate together to provide a unified computing product. To illustrate, a first software platform can include a computer-implemented photo-editing application (such as ADOBE PHOTOSHOP) and a second software platform can include a computer-implemented digital content management application for building websites, mobile apps, and forms (such as ADOBE EXPERIENCE MANAGER). Thus, separate software platforms are often associated with distinct configurations, protocols, databases, APIs, data formats, features, and/or programming languages.

As used herein, a "digital text query" refers to one or more words and/or phrases that form a request for information. The cross-platform search system can identify a digital text query based on user input via a search interface, such as text input via a search bar or audio input device. In some embodiments, a digital text query includes an "intent." In one or more embodiments, an intent refers to a purpose, goal, or target of a digital text query. For instance, in at least one embodiment, the intent of a digital text query refers to a purpose or goal that corresponds to a particular software platform.

As used herein, a "platform-specific configuration" refers to a digital set of instructions for a specific software platform (e.g., instructions for forming one or more platform-specific requests or rendering platform-specific renderings or rendition types). For example, a platform-specific configuration includes instructions that correlate with one or more intents relative to the software platform. In one or more embodiments, the instructions of a platform-specific configuration are organized into specific parameters that correspond to particular parameter values. Additionally, in some embodiments, a platform-specific configuration also includes instructions for generating a response to a digital text query that causes a client device to render platform-specific rendering. Additionally, in at least one embodiment, a platform-specific configuration includes instructions for generating auxiliary platform-specific requests (e.g., fallback requests) that are secondary to a main platform-specific request, as well as instructions for generating additional platform-specific requests in response to detected interactions with the rendered response at the client device.

As used herein, a "platform-specific request" refers to a request for information corresponding to an answer provider device corresponding to a particular software platform. In one or more embodiments, a platform-specific request includes syntax and formatting dictated by a particular platform-specific configuration. Additionally, in one or more embodiments, within this syntax and formatting, a platform-specific request includes one or more parameter values extracted from a digital text query.

As used herein, a "response to the platform-specific request" refers to a response received by the cross-platform search system in response to sending a platform-specific request to an answer provider device corresponding to a software platform. In one or more embodiments, rather than including a displayable data object (e.g., a rendered chart or list), a response to the platform-specific request includes raw data items as well as display instructions for rendering the data items at a client device. As such, in one or more embodiments, the cross-platform search system generates a "response to the digital text query" that restructures and/or reformats the response to the platform-specific request into a configuration that causes a client device to render the raw data items according to the display instructions.

In some embodiments, the cross-platform search system further generate a response to the digital text query including a "response rendition type." In one or more embodiment, a response rendition type refers to a class, category, or type of visual representation displayed via a user interface of a client device. As mentioned above, a response rendition type can be specified by a platform-specific configuration. For example, in one or more embodiments, rendition types include a table response rendition type, a reporting chart response rendition type, and a list response rendition type. Moreover, in some embodiments, the cross-platform search system generates a response to the digital text query including instructions to render one or more in-place actions at the client device. For example, in one or more embodiments, an in-place action includes at least one of a selectable button, a selectable hyperlink, a selectable media player, or another interactive element.

As used herein, "feedback information" refers to user-initiated events captured in connection with a transmitted response to a digital text query. For example, after transmission of a response to a digital text query, the cross-platform search system collects feedback information regarding whether one or more rendered items associated with the response to the digital text query were viewed or otherwise interacted with. In at least one embodiment, the cross-platform search system utilizes feedback information to further build or learn parameters of a cross-platform language processing model.

As used herein, a "query interface" or "ask interface" refers to an interactive display element for entering and/or receiving digital text queries. In one or more embodiments, the cross-platform search system receives digital text queries via the query interface available on any of the software platform systems registered with the cross-platform search system. In one or more embodiments, the query interface is expandable to become a "response rendition canvas." For example, a response rendition canvas is a display area within a software platform user interface where a client device renders a response to a digital text query. As such, a response rendition canvas can include rendered digital objects including tables, lists, charts, media players, buttons, links, and so forth.

As used herein, a "cross-platform language processing model" refers to a natural language processing model built from training data corresponding to multiple software platforms. In one or more embodiments, the cross-platform language processing model is a machine learning model with one or more parameters that can be built or tuned (e.g., trained) based on inputs to approximate unknown functions. In particular, the term machine learning model learns to approximate complex functions and generate outputs based on inputs provided to the model. The machine learning model includes, for example, decision trees, k-nearest neighbor, neural networks, long-short term memory, deep learning architectures, classifiers, or a combination of the foregoing.

As just mentioned, a machine learning model can include a neural network model. In particular, the term neural network can include a model of interconnected artificial neurons (or layers) that communicate and learn to approximate complex functions and generate outputs based on a plurality of inputs provided to the model. In particular, a neural network includes a computer-implemented algorithm that implements deep learning techniques to analyzes input to make predictions. In some embodiments, a neural network can employ supervised learning, while in other embodiments a neural network can employ unsupervised learning or reinforced learning. Examples of neural networks include deep convolutional neural networks, generative adversarial neural networks, and recurrent neural networks (e.g., long short term memory neural networks or LSTMs).

A recurrent neural network refers to a type of neural network that performs analytical tasks on sequential elements and analyzes individual elements based on computations (e.g., latent feature vectors) from other elements. In particular, a recurrent neural network includes an artificial neural network that uses sequential information associated with words in a text input (e.g., a sentence), and in which an output of a current word is dependent on computations (e.g., latent feature vectors) for previous words.

Furthermore, as used herein, a long short-term memory neural network or LSTM neural network refers to a type of recurrent neural network capable of learning long-term dependencies in sequential information. Specifically, an LSTM neural network can include a plurality of layers that interact with each other to retain additional information between LSTM units (e.g., long short-term memory units that are layers of the neural network for analyzing each sequential input, such as each word) of the network in connection with a state for each LSTM unit. An LSTM state refers to a component of each LSTM unit that includes long-term information from previous LSTM units of the LSTM neural network. The LSTM neural network can update the LSTM state for each LSTM unit (e.g., during an update stage) by using the plurality of layers to determine which information to retain and which information to forget from previous LSTM units. The LSTM state of each LSTM unit thus influences the information that is retained from one LSTM unit to the next to form long-term dependencies across a plurality of LSTM units.

For example, in one or more embodiments, the cross-platform search system builds, learns, or trains the cross-platform language processing model utilizing "previous digital text queries" and "ground truth intents." For instance, previous digital text queries refer to natural language queries (e.g., previously received by the cross-platform search system, or otherwise generated) that include one or more intents. Accordingly, the ground truth intents are known or labeled intents for the previous digital text queries.

In one or more embodiments, the cross-platform search system trains the cross-platform language processing model to generate an intent from a digital text query along with a matching score for that intent. As used herein, a "matching score" reflects a classification probability that the determined intent corresponds with at least one registered intent (e.g., an intent indicated by at least one platform-specific configuration). To illustrate, in response to receiving a digital text query, "How is journey 'sunglasses promotion' performing," the cross-platform search system can utilize the cross-platform language processing model to generate an output of "journey performance—90%." In one or more embodiments, this output indicates a 90% likelihood that the registered intent associated with the digital text query is "journey performance."

As used herein, a "platform-specific configuration mapping" refers to an organization of multiple platform-specific configurations. For example, in one or more embodiments, the cross-platform search system organizes platform-specific configurations within the platform-specific configuration mapping according to the one or more intents specified in each configuration, as well as by software platforms indicated by each configuration.

Additional detail regarding the cross-platform search system will now be provided with reference to the figures. For example, FIG. 1 illustrates a schematic diagram of an example system environment 100 (e.g., the "environment" 100) for implementing a cross-platform search system 108, in accordance with one or more embodiments. Thereafter, a more detailed description of the components and processes of the cross-platform search system 108 is provided in relation to the subsequent figures.

As shown in FIG. 1, the environment 100 includes server(s) 102a, answer provider server(s) 102b, answer provider server(s) 102c, an administrator computing device 106, a client device 110, and a network 116. Each of the components of the environment 100 communicate via the network 116, and the network 116 may be any suitable network over which computing devices communicate. Example networks are discussed in more detail below in relation to FIG. 9.

As mentioned, the environment 100 includes the client device 110, and the administrator computing device 106. The client device 110, and the administrator computing device 106 include one of a variety of computing devices, including a smartphone, tablet, smart television, desktop computer, laptop computer, virtual reality device, augmented reality device, or other computing device as described in relation to FIG. 9. In one or more embodiments, the client device 110 is associated with an origination point of a digital text query and a terminal point of a response to a digital text query, while the administrator computing device 106 is associated with a submission point for registration of one or more software platforms. In other words, the administrator computing device 106 is associated with a submission point for one or more platform-specific configurations, previous digital text queries, and corresponding ground truth intents (e.g., training data for a cross-platform language processing model).

For instance, in one embodiment, the administrator computing device 106 is a submission point for platform-specific configurations, previous digital text queries, and corresponding ground truth intents associated with the software platform system 114a. Additionally or alternatively, the administrator computing device 106 may be associated with different or additional software platform systems. Thus, while the administrator computing device 106 acts as a submission point for training data associated with one or more software platform systems, the administrator computing device 106 hosts the cross-platform search system 108 (or other native application that coordinates with the cross-platform search system 108) whereby the training data is submitted. Although FIG. 1 illustrates a number of computing devices 106, 110, in some embodiments, the environment 100 includes multiple different computing devices, each associated with the same or other components of the environment 100.

As illustrated in FIG. 1, the environment 100 includes multiple server(s) 102a-102c. Each of the server(s) 102 may include one or more individual servers that may generate, store, receive, analyze, and transmit electronic data. For example, the server(s) 102a includes a cross-platform search server system 104 (e.g., mirroring and/or supplementing the cross-platform search system 108). In one or more embodiments, as discussed in greater detail below, the cross-platform search server system 104 on the server(s) 102a coordinates with the administrator client device 106 to receive platform-specific configurations and other training data in order to register one or more software platform systems (e.g., the software platform systems 114a, 114b).

In one or more embodiments, the answer provider server(s) 102b, 102c host or otherwise coordinate with the software platform system 114a and the software platform system 114b, respectively. For example, the answer provider server(s) 102b hosts the software platform system 114a such that, in response to receiving a platform-specific request associated with the software platform system 114a, the answer provider server(s) 102b receives and transmits a response that is generated by the software platform system 114a.

Additionally, in one or more embodiments, the software platform systems 114a, 114b register with the cross-platform search system 108. In other words, a user of the administrator client device 106 utilizes one or more user interfaces of the cross-platform search system 108 on the administrator client device 106 to submit platform-specific configurations associated with the software platform systems 114a, 114b along with previous digital text queries for information specific to the software platform system 114a, 114b, respectively, and ground truth intents for the previous digital text queries. Furthermore, the cross-platform search system 108 trains a cross-platform language processing model with this training data, and adds the platform-specific configurations to platform-specific configuration mapping that organizes the received platform-specific configurations by registered intents and associated software platforms. Additionally or alternatively, either or both of the software platform system 114b, 114b are unregistered with the cross-platform search system 108.

In one or more embodiments, the software platform systems 114a, 114b include separate functions and features. For example, a user of the client device 110 can access the software platform system 114a via a software platform application 112a (e.g., an installed, front-end application coordinated with the software platform system 114a). Similarly, the user of the client device 110 can access the software platform system 114b via a software platform application 112b. In one or more embodiments, the software platform applications 112a, 112b are native applications installed on the client device 110. Additionally or alternatively, the user of the client device 110 can access either or both of the software platform systems 114a, 114b via a web browser. Both of the software platform applications 112a, 112b may be initialized and running in parallel on the client device 110. Additionally or alternatively, only one of the software platform applications 112a, 112b may be initialized and running on the client device 110.

As further shown in FIG. 1, the administrator computing device 106 implements the cross-platform search system 108. For example, in one or more implementations, the cross-platform search system 108 represents and/or provides similar functionality as described herein in connection with the cross-platform search server system 104. In some implementations, the cross-platform search server system 104 supports the cross-platform search system 108 on the administrator computing device 106. Indeed, in one or more implementations, the server(s) 102a includes all, or a portion of, the cross-platform search system 108. Additionally or alternatively, in some implementations, the administrator computing device 106 includes all, or a portion of the cross-platform search server system 108. Thus, as discussed herein, the features and functionality of the cross-platform search system 108 apply in whole or in part to the cross-platform search server system 104. For ease of description, the cross-platform search system 108 will be referenced, but it will be understood that the features and functionality discussed herein with regard to the cross-platform search system 108 apply to the cross-platform search server system 104.

Although FIG. 1 illustrates the components of the environment 100 connected in a specific way, other embodiments are possible. Similarly, while FIG. 1 illustrates a given number of servers, systems, and client devices, in additional or alternative embodiments the functionality of the components of the environment 100 is implemented by any number of servers, systems, and client devices.

Figure 2:
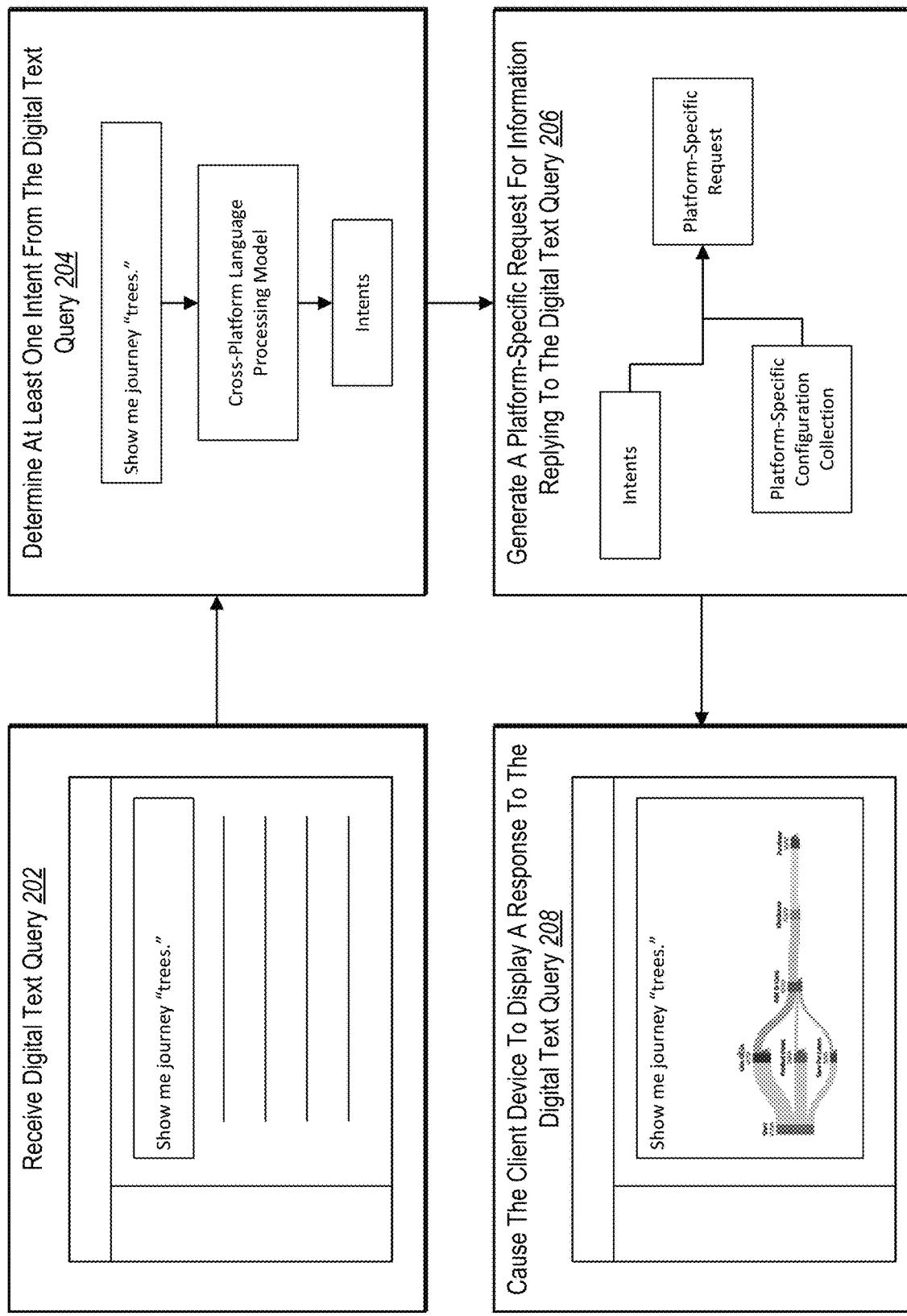
FIG. 2 illustrates an overview schematic of the cross-platform search system generating a cross-platform and contextually-based response to a digital text query in accordance with one or more embodiments.

As mentioned above, the cross-platform search system 108 generates platform-specific, contextually-based responses to natural language digital text queries—even when a digital text query is for information associated with a different software platform. FIG. 2 illustrates an overview of the cross-platform search system 108 generating a cross-platform and contextually-based response to a digital text query. For example, as shown in FIG. 2, the cross-platform search system 108 performs an act 202 of receiving a digital text query. In one or more embodiments, the cross-platform search system 108 receives the digital text query as a natural language string via an ask interface (e.g., a query interface) presented within a software platform application of a first software platform (e.g., the software platform application 112a of the software platform system 114a). In at least one embodiment, the digital text query requests information specific to a second software platform (e.g., the software platform system 114b) not generally accessible via the first software platform.

The cross-platform search system 108 further performs an act 204 of determining at least one intent from the digital text query. In one or more embodiments, the cross-platform search system 108 utilizes a cross-platform language processing model to determine an intent from the digital text query. In at least one embodiment, the cross-platform search system 108 trains the cross-platform language processing model to recognize registered intents associated with specific software platforms (e.g., the software platform system 114a and the software platform system 114b). Additionally, in one or more embodiments, the cross-platform search system 108 builds or trains the cross-platform language processing model to extract additional parameter values from the digital text query depending on the recognized registered intent.

Additionally, the cross-platform search system 108 performs an act 206 of generating a platform-specific request for information replying to the digital text query. For example, in one or more embodiments, the cross-platform search system 108 utilizes the determined intent associated with the digital text query to select a platform-specific configuration that corresponds to the determined intent and the second software platform. In at least one embodiment, the cross-platform search system 108 utilizes the parameters of the platform-specific configuration to extract parameter values from the digital text query and generate the platform-specific request. As mentioned above, in at least one embodiment, the cross-platform search system 108 trains the cross-platform language processing model on platform-specific configurations to extract correct parameter values from the digital text query. Moreover, the cross-platform search system 108 transmits the generated platform-specific request to an answer provider server(s) associated with the second software platform, and then receives a response to the platform-specific request from the second software platform via the answer provider server(s) associated with the second software platform.

The cross-platform search system 108 further performs an act 208 of causing the client device to display a response to the digital text query. For example, in response to receiving the response to the platform-specific request from the answer provider server(s) associated with second software platform, the cross-platform search system 108 reconfigures the components of the response to the platform-specific request into a format that causes those components to be rendered in a specific way. To illustrate, the cross-platform search system 108 generates the response to the digital text query such that, when transmitted to the client device, the client device displays the response to the digital text query. In one or more embodiments, the cross-platform search system 108 generates the response to the digital text query to cause the client device to render the components of the response to the platform-specific request according to at least one response rendition type. Additionally, in some embodiments, the cross-platform search system 108 generates the response to further cause the client device to render one or more interactive in-place actions.

Figure 3:
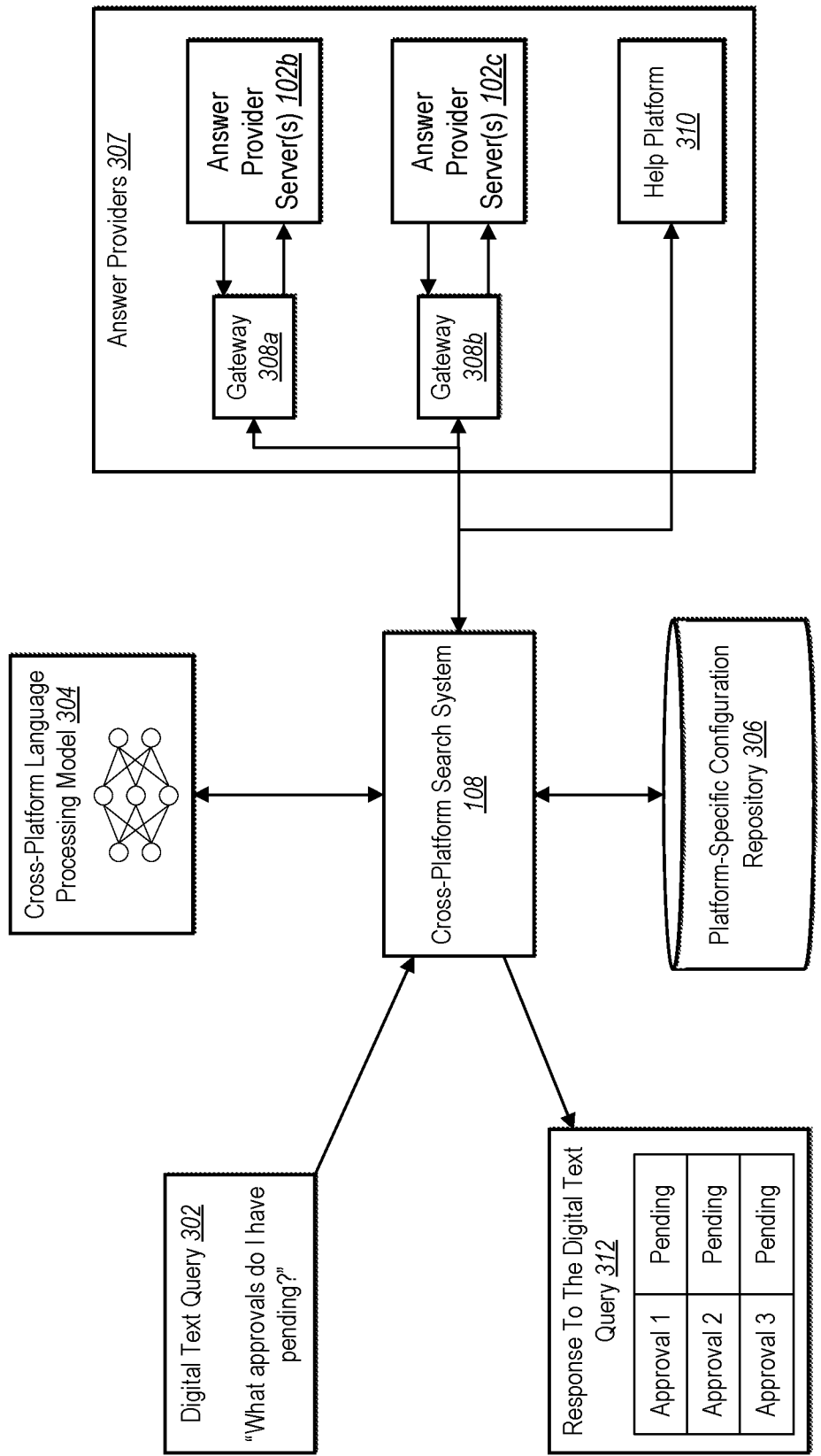
FIG. 3 illustrates a system architecture diagram of the cross-platform search system in accordance with one or more embodiments.

More detail is now provided with regard to the features and functionality of the cross-platform search system 108. As discussed above, the cross-platform search system 108 generates platform-specific requests in response to receiving a digital text query from a client device (e.g., the client device 110). FIG. 3 illustrates a diagram of the system architecture that the cross-platform search system 108 leverages to generate cross-platform responses to digital text queries. For example, as shown in FIG. 3, the cross-platform search system 108 receives a digital text query 302. In one or more embodiments, as mentioned above, the cross-platform search system 108 receives the digital text query 302 from the software platform application 112a (e.g., the native application installed on the client device 110 that coordinates with the software platform system 114a), where the digital text query 302 requests information specific to the software platform system 114b in natural language. Additionally or alternatively, the cross-platform search system 108 receives the digital text query 302 requesting information specific to the software platform system 114a, or information specific to a general help topic.

In response to receiving the digital text query 302, the cross-platform search system 108 utilizes a cross-platform language processing model 304 to determine an intent from the digital text query 302. In one or more embodiments, as will be discussed below with reference to FIG. 4, the cross-platform search system 108 learns, builds, or trains the cross-platform language processing model 304 with previous digital text queries and corresponding ground truth intents from a range of software platforms (e.g., the software platform system 114a and the software platform system 114b). For example, the cross-platform search system 108 utilizes this data to train the cross-platform language processing model 304 to determine at least one intent from a digital text query, where the determined intent is an intent registered relative to at least one platform-specific configuration in a platform-specific configuration repository 306.

To illustrate, in one example, the cross-platform search system 108 receives a digital text query including the natural language, "What approvals do I have pending?" In response to training the cross-platform language processing model 304 with data from an approval management software platform, the cross-platform language processing model 304 determines an intent of "showApprovals" from the received digital text query. Thus, the cross-platform language processing model 304 determines an intent from the digital text query that is specific to a context defined by the approval management software platform.

In response to the cross-platform language processing model 304 determining an intent from the digital text query 302, the cross-platform search system 108 selects a platform-specific configuration from the platform-specific configuration repository 306 utilizing the determined intent. For example, in one or more embodiments, the cross-platform search system 108 generates a platform-specific configuration mapping that organizes platform-specific configurations based on the intents defined therein. In one or more embodiments, as mentioned above, a platform-specific configuration defines one or more intents, as well as other parameters associated with the one or more intents.

Thus, the cross-platform search system 108 generates the platform-specific configuration mapping by identifying one or more intents in each platform-specific configuration in the platform-specific configuration repository 306 and associating the identified intents with their associated platform-specific configurations within the mapping. In at least one embodiment, the cross-platform search system 108 further associates each of the platform-specific configurations with their associated answer providers or software platforms. Accordingly, in at least one embodiment, the cross-platform search system 108 selects a platform specific configuration from the platform-specific configuration repository 306 by identifying the determined intent within the platform-specific configuration mapping, and selecting the platform-specific configuration associated with the identified intent.

Utilizing the determined intent and the selected platform-specific configuration, the cross-platform search system 108 generates a platform-specific request for information from the software platform referenced by the selected platform-specific configuration. For example, in one or more embodiments, as shown in FIG. 3, some answer providers 307, such as the answer provider server(s) 102b, 102c are accessible via a gateway 308a and a gateway 308b, respectively. Other answer providers 307, such as a help platform 310, are directly accessible. To illustrate, in at least one embodiment, the gateways 308a, 308b are application programming interfaces (APIs) of different types. For instance, in at least one embodiment, the gateway 308a is a representational state transfer API (e.g., a REST API or RESTful API), while the gateway 308b is a GraphQL API. In additional embodiments, the gateways 308a, 308b are REST APIs, GraphQL APIs, Elasticsearch APIs, or SQL Query APIs, or any other type of API.

Accordingly, in order to accommodate the different requirements of the gateways 308a, 308b in requesting information from the answer provider server(s) 102b, 102c, the cross-platform search system 108 generates a platform-specific request for information based on instructions in the selected platform-specific configuration. In one or more embodiments, the selected platform-specific configuration includes instructions for extracting parameter values from the digital text query 302 according to the determined intent. To illustrate, in response to a digital text query requesting an update on the performance of a particular campaign over the last week, the cross-platform search system 108 extracts one or more parameter values from the digital text query including the name of the campaign and the date range including the last week. As mentioned above, in at least one embodiment, the cross-platform language processing model 304 extracts parameter values along with a registered intent from the digital text query 302. In such an embodiment, the cross-platform search system 108 utilizes the already-extracted parameter values to generate the platform-specific request according to the instruction in the selected platform-specific configuration.

After extracting the parameter values from the digital text query according to the selected platform-specific configuration, the cross-platform search system 108 generates a platform-specific request utilizing the parameter values. For example, the cross-platform search system 108 generates the platform-specific request by configuring the parameter values into a syntax and format specified by the platform-specific configuration. The cross-platform search system 108 further transmits the generated platform-specific request to the answer provider (e.g., the answer provider server(s) 102c hosting the software platform system 114b) via the associated gateway 308b.

In response to receiving a response to the platform-specific request from the answer provider (e.g., from the answer provider server(s) 102c), the cross-platform search system 108 generates a response to the digital text query 312. For example, in one or more embodiments, the response to the platform-specific request provided by the answer provider is not in a displayable format. For instance, in at least one embodiment, the cross-platform search system 108 receives the response to the platform-specific request including raw data.

Accordingly, in response to receiving the response to the platform-specific request from the answer provider, the cross-platform search system 108 generates the response to the digital text query 312 by re-formatting or configuring the raw data according to display instructions in the selected platform-specific configuration. For example, the cross-platform search system 108 configures the raw data according to the display instructions in the selected platform-specific configuration such that, when transmitted to the client device, the digital text query 312 causes the client device to render the raw data according to the display instructions. In one or more embodiments, for instance, the display instructions cause the client device to render the raw data into one of multiple response rendition types.

Figure 4:
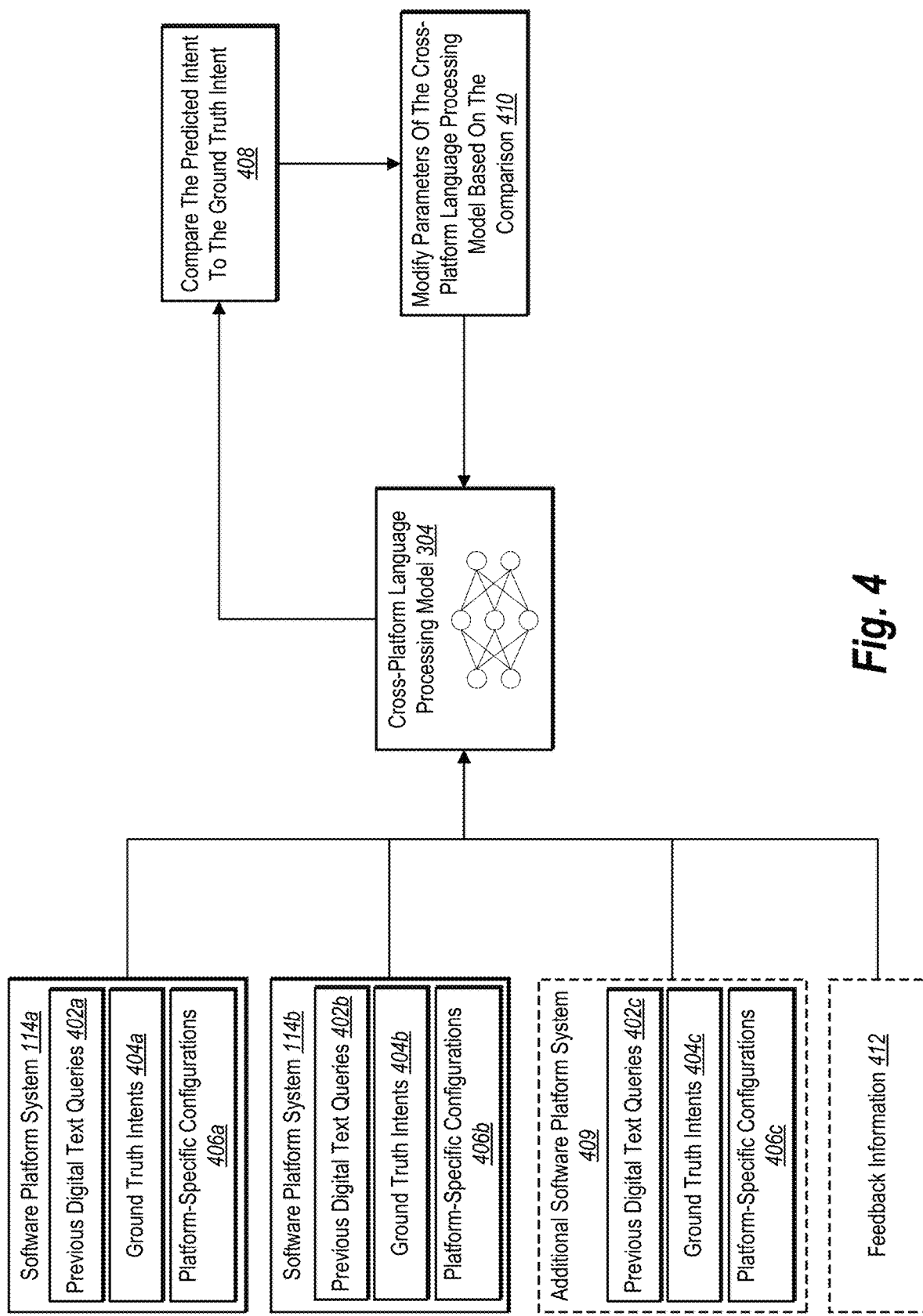
FIG. 4 illustrates an overview diagram of the cross-platform search system learning parameters of a cross-platform language processing model in accordance with one or more embodiments.

As mentioned above, the cross-platform search system 108 registers software platforms, in part, by training the cross-platform language processing model 304 with previous digital text queries and ground truth intents from the software platforms. For example, as shown in FIG. 4, the cross-platform search system 108 registers the software platform system 114a, at least in part, by training the cross-platform language processing model 304 with previous digital text queries 402a, ground truth intents 404a, and platform-specific configurations 406a from the software platform system 114a.

To illustrate, the cross-platform search system 108 utilizes the cross-platform language processing model 304 to generate a predicted intent from one of the previous digital text queries 402a. The cross-platform search system 108 further performs an act 408 of comparing the predicted intent to the ground truth intent corresponding to the input previous digital text query. Additionally, the cross-platform search system 108 performs an act 410 of modifying parameters of the cross-platform language processing model 304 based on the comparison. In one or more embodiments, the cross-platform search system 108 repeats the acts 408 and 410 in connection with the remainder of the previous digital text queries 402a and the ground truth intents 404a to further train the cross-platform language processing model 304 against the software platform system 114a.

The cross-platform search system 108 further repeats the acts 408 and 410 in connection with the previous digital text queries 402b and ground truth intents 404b from the software platform system 114b. Moreover, the cross-platform search system 108 further registers, in part, an additional software platform system 409 by performing the acts 408 and 410 in connection with previous digital text queries 402c and ground truth intents 404c of the additional software platform system 409. In this way, the cross-platform search system 108 continuously updates and evolves the cross-platform language processing model 304 by registering any number of software platform systems. For example, over multiple iterations and additions, the cross-platform search system 108 builds the cross-platform language processing model 304 to accurately and robustly determine intents from digital text queries associated with a wide range of software platform systems.

In one or more embodiments, the cross-platform search system 108 performs the act 410 of modifying the parameters of the cross-platform language processing model 304 in various ways. For example, as mentioned above, in one embodiment, the cross-platform language processing model 304 is a knowledge graph where terms or phrases of previous digital text queries are associated with registered intents (e.g., ground truth intents) in the knowledge graph. In one or more embodiment, the cross-platform language processing model 304 learns weighted edges between nodes in the knowledge graph. Moreover, in some implementations the cross-platform language processing model 304 utilizes the knowledge graph as part of a graph neural network (e.g., with one or more neural network layers that generate an intent prediction based on weights between nodes within the knowledge graph neural network). Moreover, the cross-platform search system 108 performs the act 410 by modifying internal parameters and/or the weighted edges in the knowledge graph to reflect the terms or phrases of the previous digital text queries that correspond with the ground truth intents.

In another embodiment, the cross-platform language processing model 304 is a neural network. In that embodiment, the cross-platform search system 108 performs the act 410 by modifying parameters of the neural network based on the results of the comparison performed in the act 408. For example, based on this comparison, the cross-platform search system 108 modifies parameters of the cross-platform language processing model 304 to reduce a measure of loss. To illustrate, the cross-platform search system 108 applies a loss function to determine the measure of loss, where a greater measure of loss indicates a larger disparity between the predicted intent and the corresponding ground truth intent, and a smaller measure of loss indicates a smaller disparity between the predicted intent and the corresponding ground truth intent. In one or more embodiments, the cross-platform search system 108 utilizes one or more loss functions to determine the measure of loss including, but not limited to: mean squared error, likelihood loss, and cross entropy loss.

In one or more embodiments, the cross-platform search system 108 modifies parameters of the cross-platform language processing model 304 through back-propagation of the measure of loss from the loss function. For example, the cross-platform search system 108 determines the measure of loss based on applying the loss function to the predicted intents in connection with the ground truth intents 404a, 404b. The cross-platform search system 108 then back-propagates that measure of loss to modify parameters of the cross-platform language processing model 304 in order to minimize the measure of loss associated with future comparisons of additional generated predictions and ground truths (e.g., the predicted intents generated from the previous digital text queries 402c associated with the additional software platform system 409).

In one or more embodiments, the cross-platform search system 108 continues training the cross-platform language processing model 304 until either the training data (e.g., including the previous digital text queries 402a, 402b and the ground truth intents 404a, 404b) is exhausted or the measure of loss converges (e.g., satisfies a threshold convergence value and/or is stable over a threshold number of training cycles). The cross-platform search system 108 may periodically retrain the cross-platform language processing model 304 in the same manner illustrated in FIG. 4. Once training of the cross-platform language processing model 304 is complete, the cross-platform search system 108 applies the cross-platform language processing model 304 to unknown digital text queries (e.g., digital text queries with no corresponding ground truth intents) to determine intents associated with those digital text queries with a high degree of accuracy.

In at least one embodiment, such as the embodiment where the cross-platform language processing model 304 is a neural network, the cross-platform search system 108 further trains the cross-platform language processing model 304 to extract parameter values associated with determined intents. For example, in at least one embodiment, as shown in FIG. 4, the software platform systems 114a, 114b, and the additional software platform system 409 provide platform-specific configurations 406a, 406b, 406c associated with the other training data. Accordingly, in this embodiment, in response to determining that the cross-platform language processing model 304 accurately determines a particular intent, the cross-platform search system 108 trains the cross-platform language processing model 304 to extract parameter values defined within a platform-specific configuration associated with the particular intent.

To illustrate, in response to determine that the cross-platform language processing model 304 accurately determines an intent, "show performance" relative to the software platform system 114a, the cross-platform search system 108 identifies one or more of the platform-specific configurations 406a that are associated with the intent, "show performance." The cross-platform search system 108 further trains the cross-platform language processing model 304 to extract one or more parameter values defined by the one or more identified platform-specific configurations. For example, the cross-platform search system 108 trains the cross-platform language processing model 304 to extract parameter values from the input digital text query such as, but not limited to, a title of a particular data object (e.g., "Journey: Mike's Burger Sales"), and a time range (e.g., "May 2021-June 2021"). The cross-platform search system 108 additionally trains the cross-platform language processing model 304 to extract additional parameter values from metadata associated with the query-submitting client device such as, but not limited to, user profile information, software platform application information, browser information, and so forth.

As further shown in FIG. 4, in at least one embodiment, the cross-platform search system 108 further trains the cross-platform language processing model 304 on feedback information 412. In one or more embodiments, feedback information 412 includes information reflecting how responses to digital text queries are viewed and interacted with by users. For example, for a particular response to a digital text query, associated feedback information can include interaction information indicating that a user viewed the rendered response (e.g., from eye-tracking data or device display information), that the user selected the rendered response (e.g., from user interaction data), and that the user was satisfied with the rendered response (e.g., from a comparison to a subsequent user interaction or digital text query).

Figure 5:
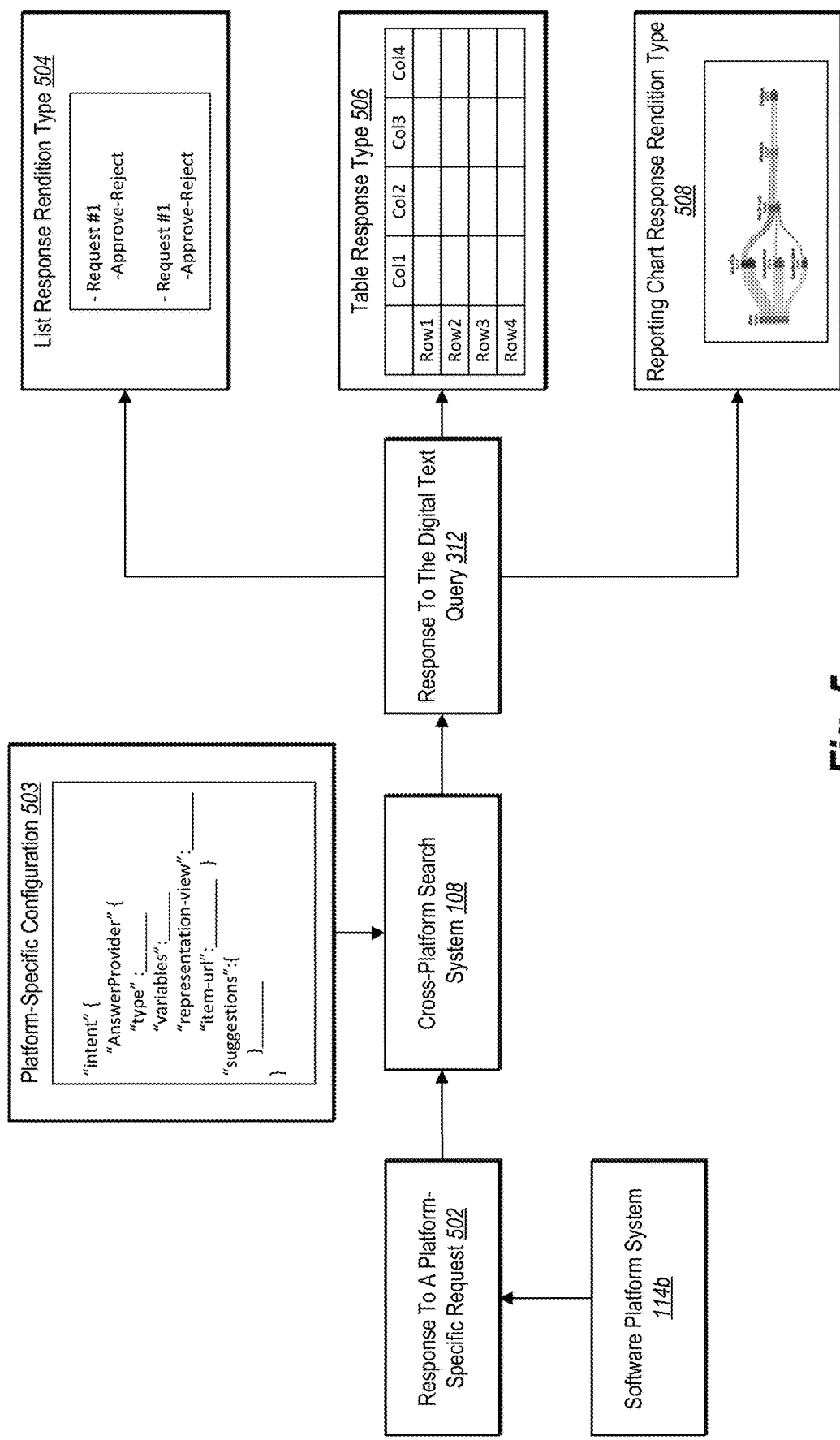
FIG. 5 illustrates a diagram of the cross-platform search system generating a response to a digital text query according to one of three response rendition types.

As mentioned above, in one or more embodiments, the cross-platform search system 108 generates a response to a digital text query according to at least one response rendition type. FIG. 5 illustrates a diagram of the cross-platform search system 108 generating a response to a digital text query according to one of three response rendition types. As discussed above, the cross-platform search system 108 utilizes platform-specific configurations in various ways. For example, in one or more embodiments, a platform-specific configuration includes multiple templatized sections, where each section includes instructions for the cross-platform search system 108 to perform various actions. To illustrate, as discussed above and in response to receiving a digital text query, the cross-platform search system 108 generates a platform-specific request by formatting parameter values associated with a particular intent according to instructions in a section of a platform-specific configuration that defines how to format platform-specific requests relative to the particular software platform associated with the platform-specific request. In addition to utilizing the platform-specific configuration to generate the platform-specific request, the cross-platform search system 108 also utilizes a section of the platform-specific configuration that defines how to generate digital text query responses to generate a digital text query response from the software platform response to the platform-specific request. Moreover, in some embodiments, the cross-platform search system 108 also utilizes a section of the platform-specific configuration to generate auxiliary platform-specific requests (e.g., fallback requests) that are defined as backup options within the platform-specific configuration in case of a returned error from the software platform system.

In more detail, as shown in FIG. 5, the cross-platform search system 108 receives a response to a platform-specific request 502. As discussed above, the cross-platform search system 108 receives the response to the platform-specific request 502 from a specific answer provider (e.g., the answer provider server(s) 102c associated with the software platform system 114b) after transmitting a platform-specific request to that answer provider. As further discussed above, the cross-platform search system 108 generates the platform-specific request according to a platform-specific configuration 503. For example, the cross-platform search system 108 utilizes the instructions within the platform-specific configuration 503 to format a platform-specific request based on the determined intent of the digital text query and including parameter values arranged within a syntax that corresponds to the software platform system 114b (e.g., and/or the gateway 308a).

As mentioned above, in addition to including instructions for generating the platform-specific request, the platform-specific configuration 503 also includes instructions for generating a response to the digital text query 312. For example, in at least one embodiment, the platform-specific configuration 503 includes instructions for configuring or formatting the response to the platform-specific request 502 into the response to the digital text query 312. To illustrate, in one or more embodiments, the platform-specific configuration 503 includes instructions for generating the digital text query 312 according to at least one response rendition type.

In one or more embodiments, the cross-platform search system 108 utilizes the platform-specific configuration 503 to generate the response to the digital text query 312 according to one of a list response rendition type 504, a table response rendition type 506, or a reporting chart response rendition type 508. In more detail, the cross-platform search system 108 generates the response to the digital text query 312 according to the list response rendition type 504 by including display instructions within the response to the digital text query 312 specifying how to display the raw data within the platform-specific request 502 within a list of items, sub-items, and so forth. Additionally, the cross-platform search system 108 generates the response to the digital text query 312 according to the table response rendition type 506 by including display instructions within the response to the digital text query 312 specifying how to display the raw data within the platform-specific request 502 within rows and columns of a table. Furthermore, the cross-platform search system 108 generates the response to the digital text query 312 according to the reporting chart response rendition type 508 by including display instructions within the response to the digital text query 312 specifying how to display the raw data within the platform-specific request 502 within a chart or other complex visualization.

In one or more embodiments, the cross-platform search system 108 provides the response to the digital text query 312 to the client device 110 to cause the client device 110 to display the response to the digital text query 312 according to the display instructions. In at least one embodiment, for example, the cross-platform search system 108 does not render the digital text query response at the server-level. Instead, the cross-platform search system 108 generates the response to the digital text query 312 including raw data received from the software platform system 114b and the display instructions associated with at least one rendition type. Thus, when provided to the client device 110, the response to the digital text query 312 causes the client device 110 to generate a display of the raw data according to the display instructions. In this way, the response to the digital text query 312 causes the client device 110 to generate results in real-time, rather than providing a pre-rendered display.

Figure 6A:
FIGS. 6A-6I illustrate the cross-platform search system generating and providing an ask interface in connection with a software platform application to provide responses to cross-platform digital text queries in accordance with one or more embodiments.

As discussed above, the cross-platform search system 108 generates platform-specific responses to digital text queries received via a query interface of a client device, and provides the platform-specific response via the same query interface (e.g., ask interface). FIGS. 6A-6L illustrate the cross-platform search system 108 generating and providing responses to digital text queries via a query interface of the client device 110. For example, as shown in FIG. 6A, the software platform application 112a installed on the client device 110 generates a user interface 604 on a display 602 of the client device 110. As further shown in FIG. 6A, the software platform application 112a generates the user interface 604 including a query interface 606 (e.g., an ask interface). As will be discussed in greater detail below, the cross-platform search system 108 receives digital text queries and provides responses via the query interface 606.

Figure 6B:
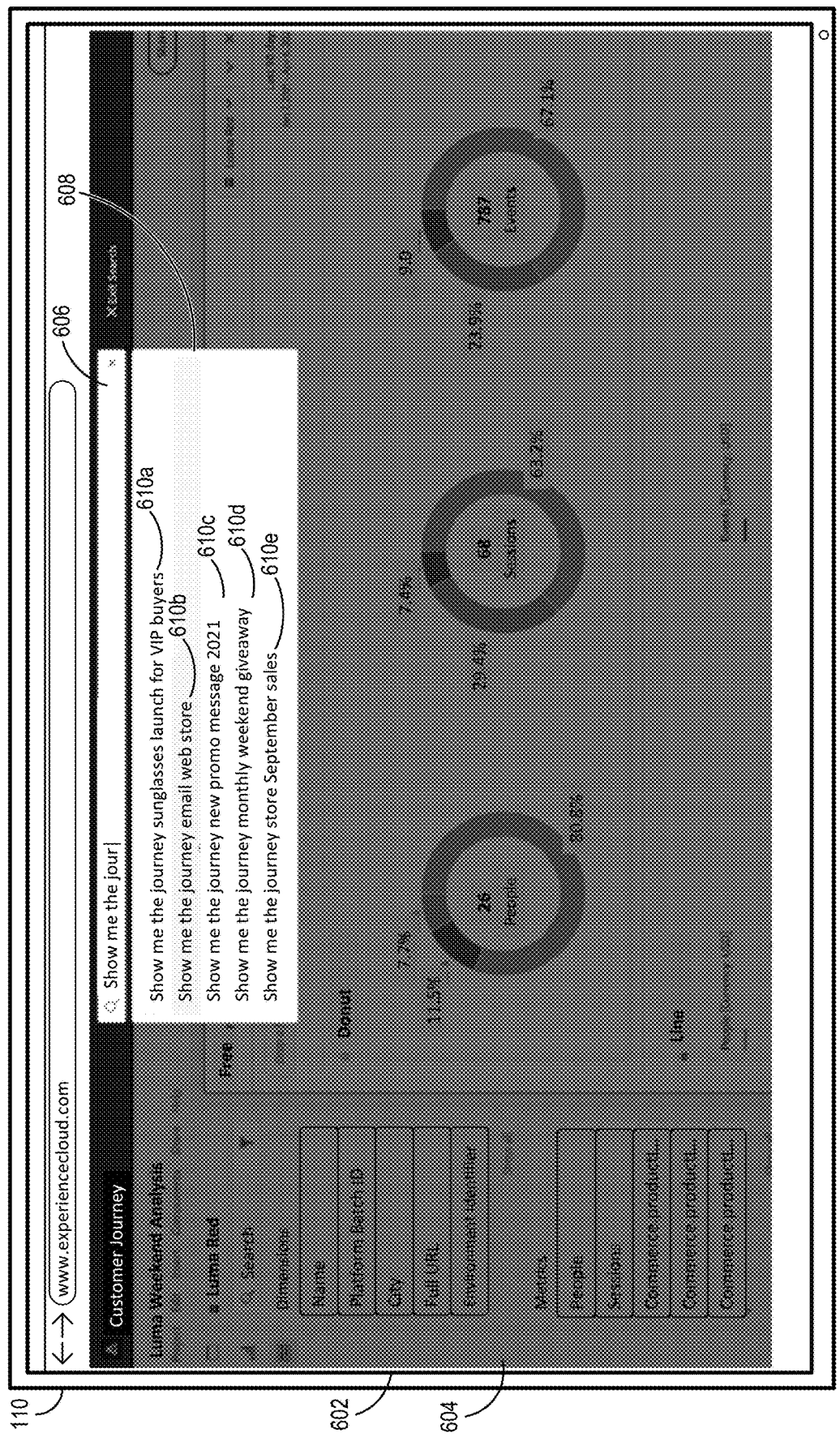

For example, as shown in FIG. 6B, the cross-platform search system 108 detects user input via the query interface 606 (e.g., "Show me the jour"). In one or more embodiments, in response to detecting user input via the query interface 606, the cross-platform search system 108 causes the client device 110 to display a suggestion interface 608. For instance, the cross-platform search system 108 causes the client device 110 to display the suggestion interface 608 including one or more query suggestions 610a, 610b, 610c, 610d, and 610e.

In at least one embodiment, the cross-platform search system 108 determines one or more of the query suggestions 610a-610e based on previous digital text queries received via the query interface 606. Additionally or alternatively, the cross-platform search system 108 determines one or more of the query suggestions 610a-610e based on common global digital text queries (e.g., across all users of the cross-platform search system 108). Additionally or alternatively, the cross-platform search system 108 determines one or more of the query suggestions 610a-610e based on metadata or one or more tokens associated with the user of the client device 110 indicating activity of the user in the software platform application 112a, and/or other applications (e.g., the software platform application 112b). Additionally or alternatively, the cross-platform search system 108 determines one or more of the query suggestions 610a-610e based on recently accessed items within the software platform application 112a. Additionally or alternatively, the cross-platform search system 108 determines one or more of the query suggestions 610a-610e from training data (e.g., previous digital text queries, ground truth intents, and/or platform-specific configurations) provided by one or more software platform systems.

Figure 6C:
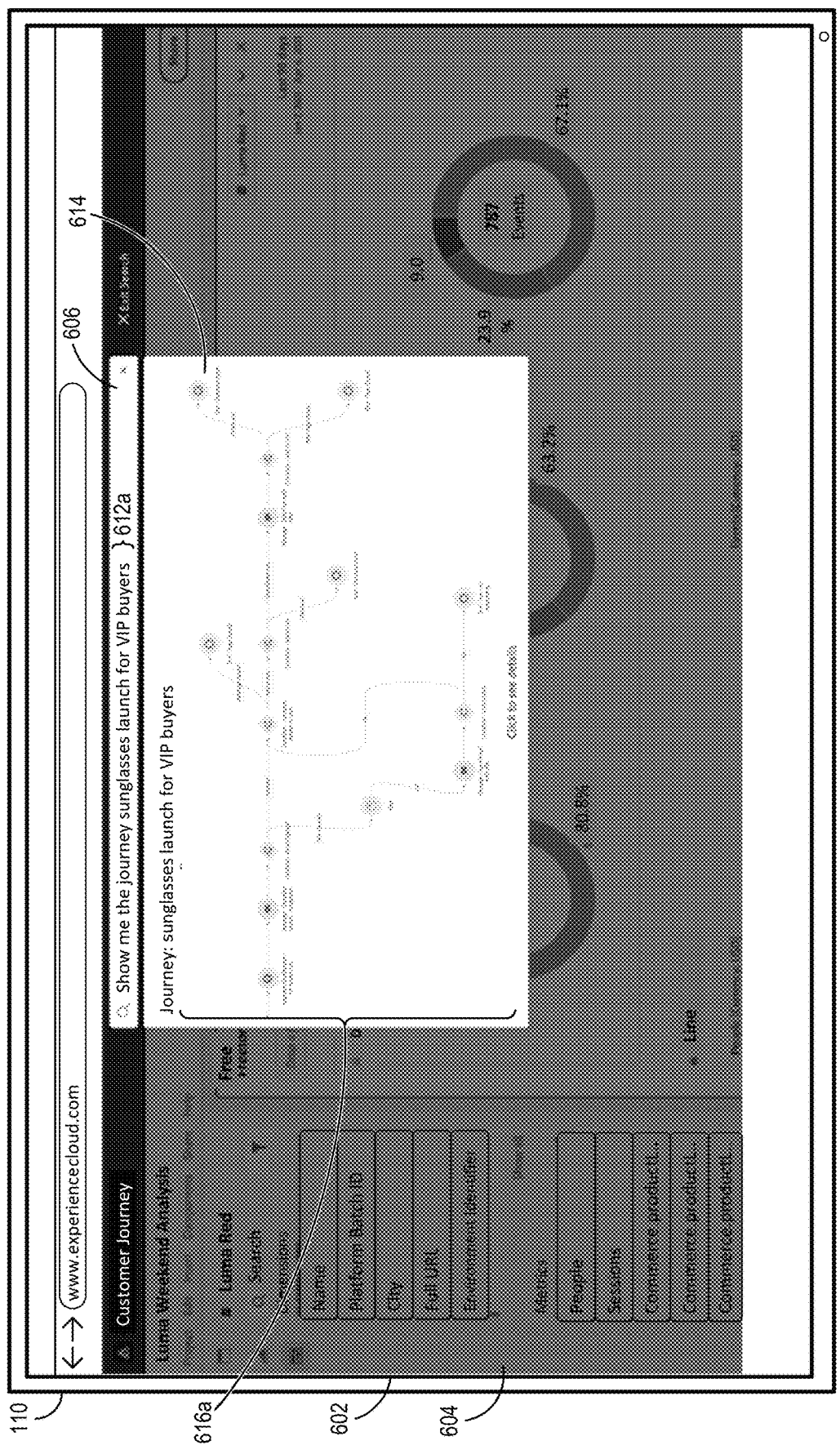

In response to either a detected selection of one of the query suggestions 610a-610e or a detected textual input via the query interface 606, the cross-platform search system 108 receives a digital text query 612a, as shown in FIG. 6C. As shown, the cross-platform search system 108 receives the digital text query 612a including a natural language request for information from a software platform system 114b (e.g., a different software platform different from the software platform associated with the software platform application 112a currently displaying the user interface 604). In this example, the digital text query 612a includes a request for information related to a "journey" entitled "sunglasses launch for VIP buyers." In one or more embodiments, the cross-platform search system 108 utilizes the cross-platform language processing model 304 to determine an intent from the digital text query 612a. For example, the cross-platform search system 108 utilizes the cross-platform language processing model 304 to determine an intent of "show journey" or similar from the digital text query 612a. As illustrated by this embodiment, the cross-platform search system 108 determines an intent for the term "journey" that is contextually-specific to the software platform system 114a beyond the typical meaning of the word "journey."

As discussed above, the cross-platform search system 108 further utilizes the determined intent to select a platform-specific configuration. The cross-platform search system 108 then utilizes the platform-specific configuration to generate a platform-specific request that includes one or more parameter values extracted from the digital text query 612a (e.g., the data object title "sunglasses launch for VIP buyers"). Additionally, in one or more embodiments, the cross-platform search system 108 generates the platform-specific request including other parameter values extracted from local data (e.g., cookie data, temporary internet file data). The cross-platform search system 108 then transmits the generated platform-specific request to the answer provider specified by the platform-specific configuration (e.g., the software platform system 114b), and receives a response to the platform-specific request.

From the response to the platform-specific request, the cross-platform search system 108 generates a response to the digital text query 612a that causes the client device 110 to display information from the response to the platform-specific request according to the platform-specific configuration. For example, as shown in FIG. 6C, the cross-platform search system 108 generates the response to the digital text query 612a that causes the client device 110 to expand the query interface 606 into a response rendition canvas 614. The cross-platform search system 108 further generates the response to the digital text query 612a to cause the client device 110 to render the response 616a within the response rendition canvas 614.

In one or more embodiments, and as discussed above, the cross-platform search system 108 generates the response to the digital text query 612a that causes the client device 110 (e.g., via the software platform application 112a) to render the response 616a including raw data (e.g., from the software platform system 114b) formatted according to at least one response rendition type. For example, the cross-platform search system 108 causes the client device 110 to render the response 616a according to a reporting chart response rendition type. For instance, as shown in FIG. 6C, the cross-platform search system 108 causes the client device 110 to render the response 616a according to the reporting chart response rendition type that includes information from the response to the platform-specific request in a chart or data visualization that includes visual indicators of relationships between data points (e.g., a "journey"). In additional embodiments, the cross-platform search system 108 provides responses to digital text queries that cause the client device 110 to render displays within the response rendition canvas 614 that include lists, tables, and other response rendition types.

In one or more embodiments, the response rendition type of a platform-specific configuration is particular to the software platform system associated with that platform-specific configuration. For example, in one embodiment, a particular response rendition type is specific to the software platform system 114b. In other words, the software platform application 112a coordinated with the software platform system 114a may not generally display information according to the particular response rendition type specific to the software platform system 114b. In that embodiment, the cross-platform search system 108 generates a response to a digital text query such that the client device 110 renders the response according to the particular response rendition type within the software platform application 112a, even though the software platform application 112a does not generally render data according to the particular response rendition type. Thus, for example, the cross-platform search system 108 can provide a rendition from ADOBE TARGET (e.g., a first software platform) as part of a search result within ADOBE PHOTOSHOP (e.g., a second software platform).

Figure 6D:
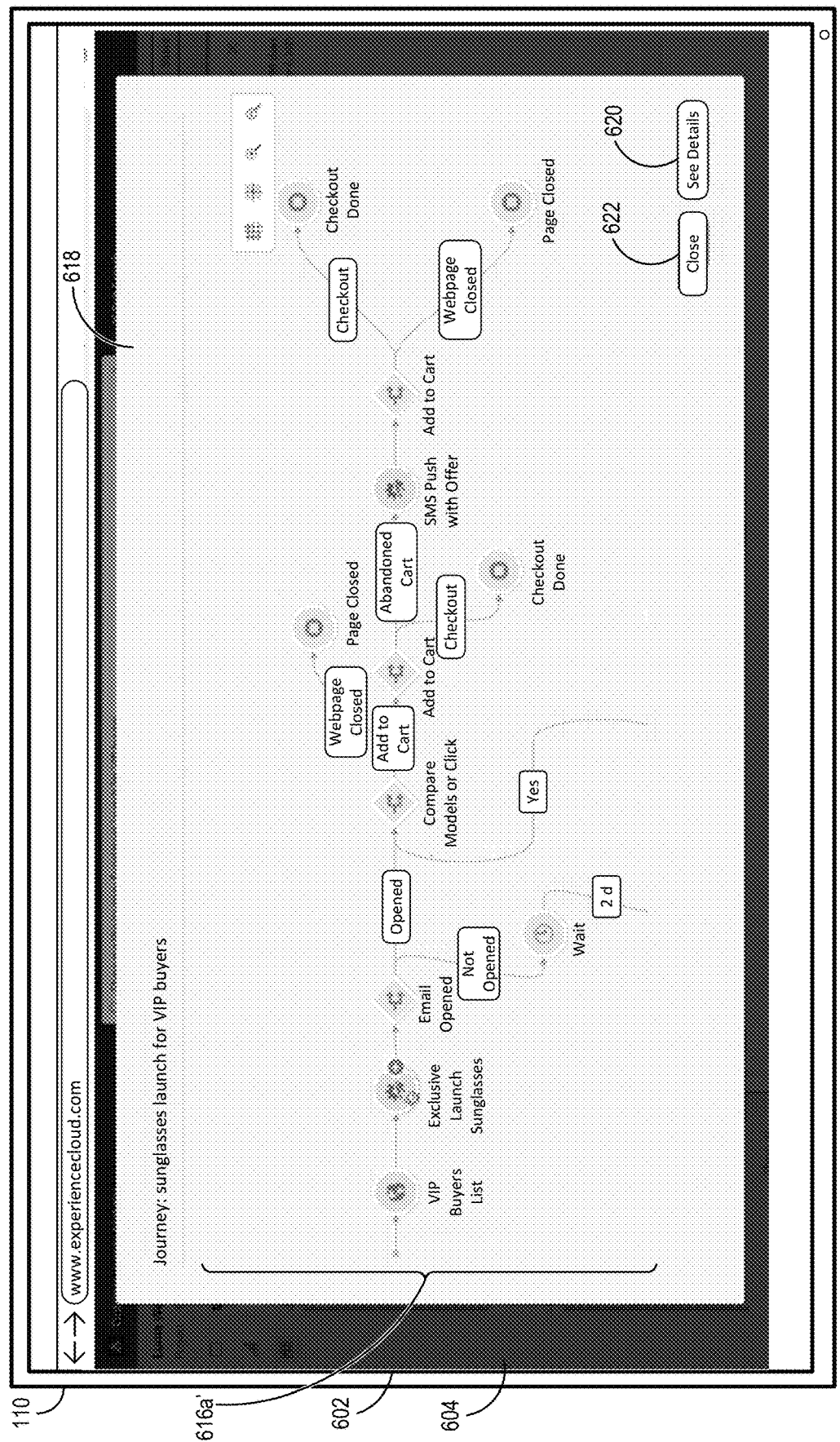

In one or more embodiments, the cross-platform search system 108 provides additional functionality in connection with the response 616a. For example, in response to a detected selection of the response 616a, the cross-platform search system 108 generates a user interface 618 including an enhanced view 616a' of the response 616a, as shown in FIG. 6D. In one or more embodiments, the cross-platform search system 108 generates the enhanced view 616a' including an enlargement of the response 616a. Additionally, in one embodiment, the cross-platform search system 108 generates the enhanced view 616a' with additional features and interactive functionality. For instance, in that embodiment, the cross-platform search system 108 generates the enhanced view 616a' with hover-over capabilities, such as providing additional information from the response to the platform-specific request in response to a detected mouse-hover or long touch gesture in connection with one or more displayed elements in the enhanced view 616a'. In additional embodiments, the cross-platform search system 108 generates the enhanced view 616a' including additional information, detail, and/or interactive elements.

Additionally, the cross-platform search system 108 generates the enhanced view 616a' including a close button 622 and a details button 620. In one or more embodiments, the cross-platform search system 108 causes the enhanced view 616a' to be removed from the user interface 604 in response to a detected selection of the close button 622. Additionally, in one or more embodiments, the cross-platform search system 108 performs one or more actions in response to a detected selection of the details button 620. For example, in one embodiment, the cross-platform search system 108 initiates a software platform application (e.g., the software platform application 112b) associated with the software platform that provided the response to the platform-specific request (e.g., the software platform system 114b) in response to a detected selection of the details button 620. Additionally, in at least one embodiment, the cross-platform search system 108 further switches focus to the now initiated software platform application in response to the detected selection of the details button 620.

Figure 6E:
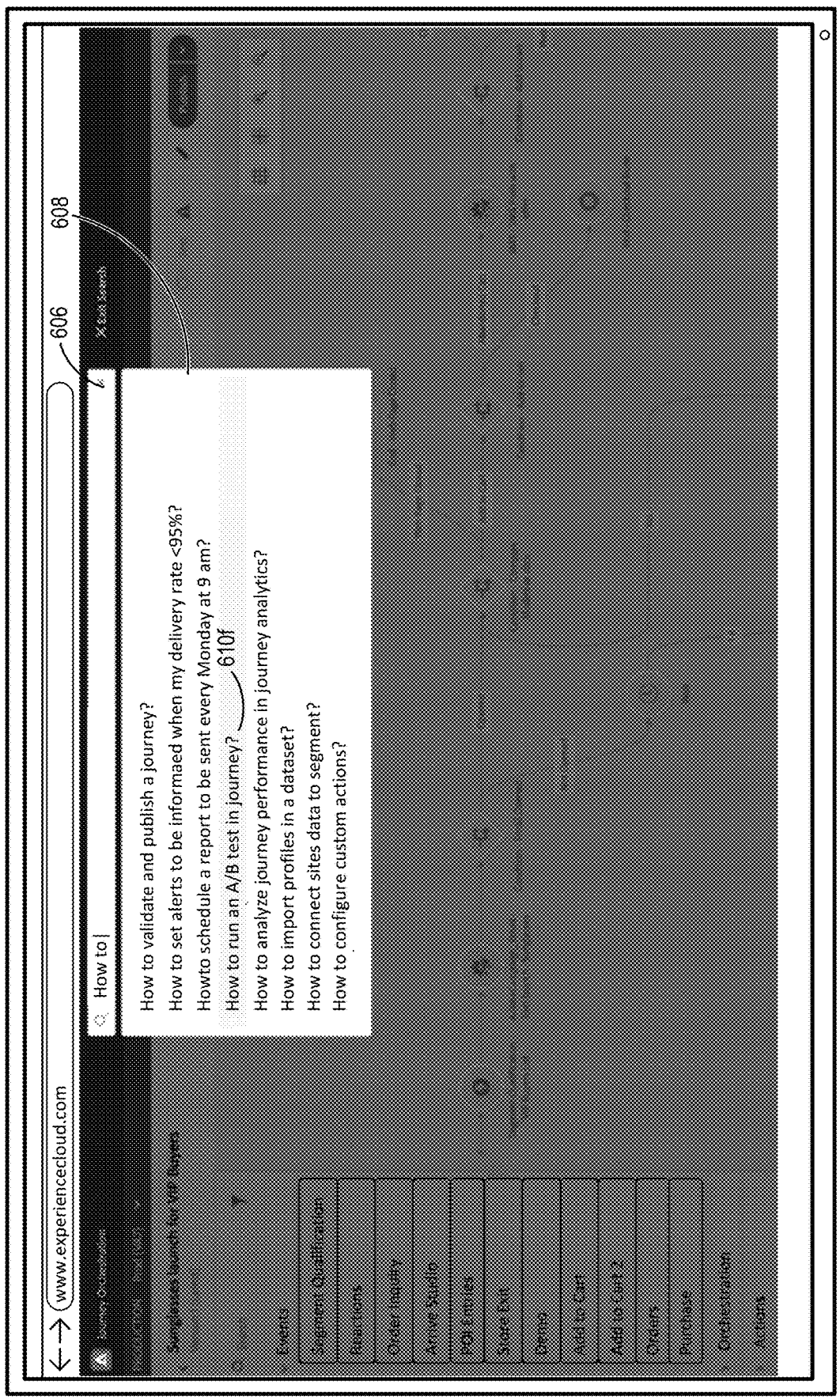

As discussed above, the cross-platform search system 108 provides responses to digital text queries for information from a range of software platforms. Additionally, in response to determining that a digital text query is not associated with a registered intent, the cross-platform search system 108 determines a keyword-based response to the digital text query. For example, as shown in FIG. 6E, the cross-platform search system 108 detects a user selection of the query suggestion 610f from the suggestion interface 608 associated with the query interface 606.

In response to this detected selection, the cross-platform search system 108 utilizes the cross-platform language processing model 304 as discussed above. In one or more embodiments, as mentioned above, the cross-platform language processing model 304 outputs a matching score reflecting a classification probability that a determined intent of a digital text query corresponds with a registered intent from at least one platform-specific configuration. For example, as discussed above in connection with FIG. 6B, the cross-platform language processing model 304 output a high matching score (e.g., a matching score satisfying a threshold range such as 70%-100% likely) indicating that the determined intent "show journey" corresponds with a registered intent from a particular platform-specific configuration. In connection with the query suggestion 610f, the cross-platform language processing model 304 may generate a low matching score indicating that a determined intent of "A/B testing" does not correspond with any registered intent from any platform-specific configurations.

In response to determining, based on the output of the cross-platform language processing model 304, that the digital text query corresponding to the query suggestion 610f is not associated with a registered intent, the cross-platform search system 108 performs a keyword-based search in connection with a fallback answer provider. For example, the cross-platform search system 108 extracts one or more keywords from the digital text query (e.g., the query suggestion 610f) and utilizes the one or more keywords to query one or more help platforms (e.g., such as the help platform 310 illustrated in FIG. 3).

Figure 6F:
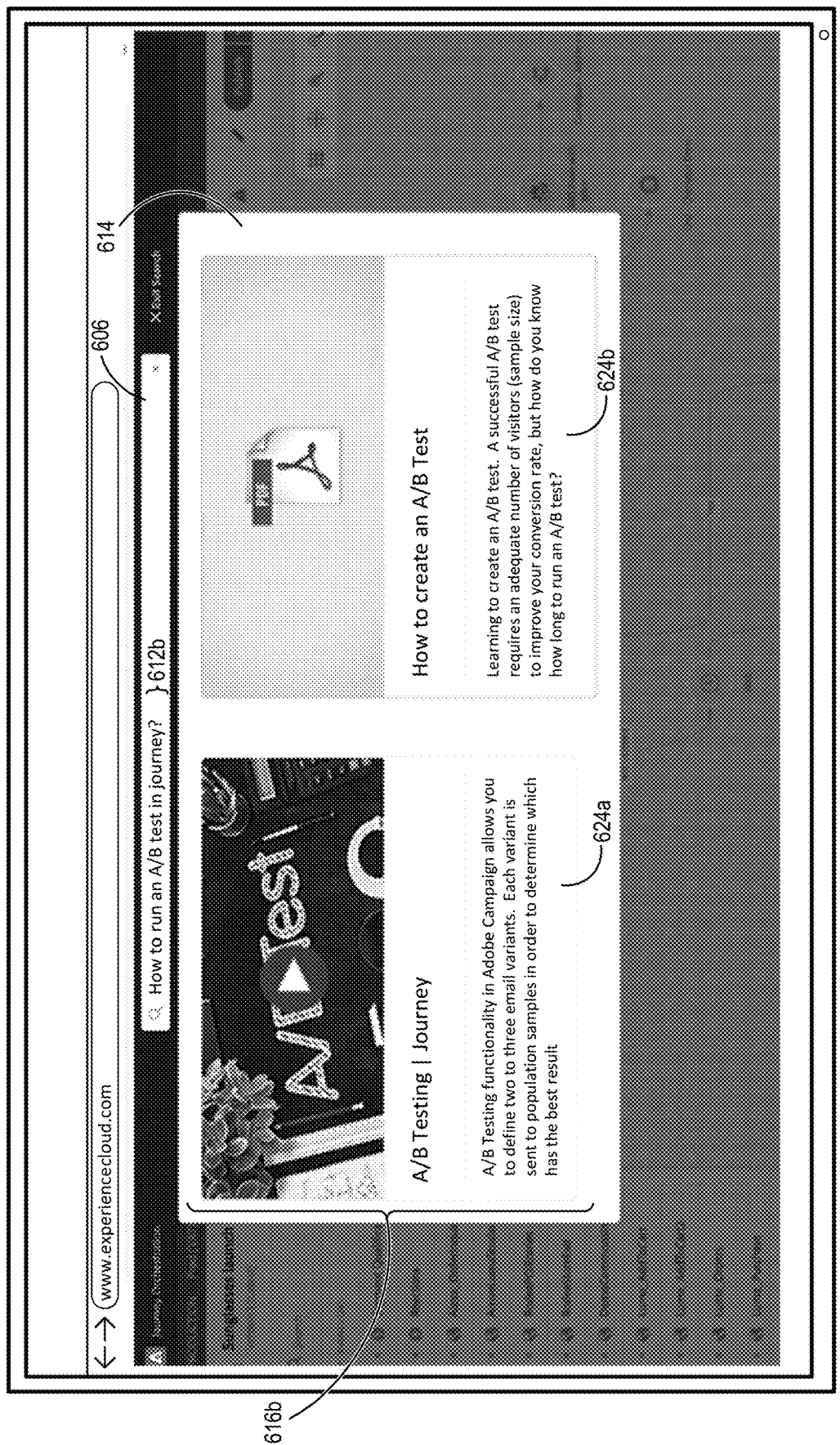

As shown in FIG. 6F, the cross-platform search system 108 further generates one or more query responses from one or more received help platform responses to the keyword-based query. For example, the cross-platform search system 108 causes the client device 110 to expand the query interface 606 into the response rendition canvas 614. The cross-platform search system 108 further generates the response 616b to the digital text query 612b including the query response items 624a, 624b within the response rendition canvas 614. In one or more embodiments, the cross-platform search system 108 generates the query response items 624a, 624b including one or more of a media player associated with a digital video, a document preview (e.g., a PDF document preview, a WORD document preview), a link to a digital content item, and/or a digital image preview or link.

Figure 6G:
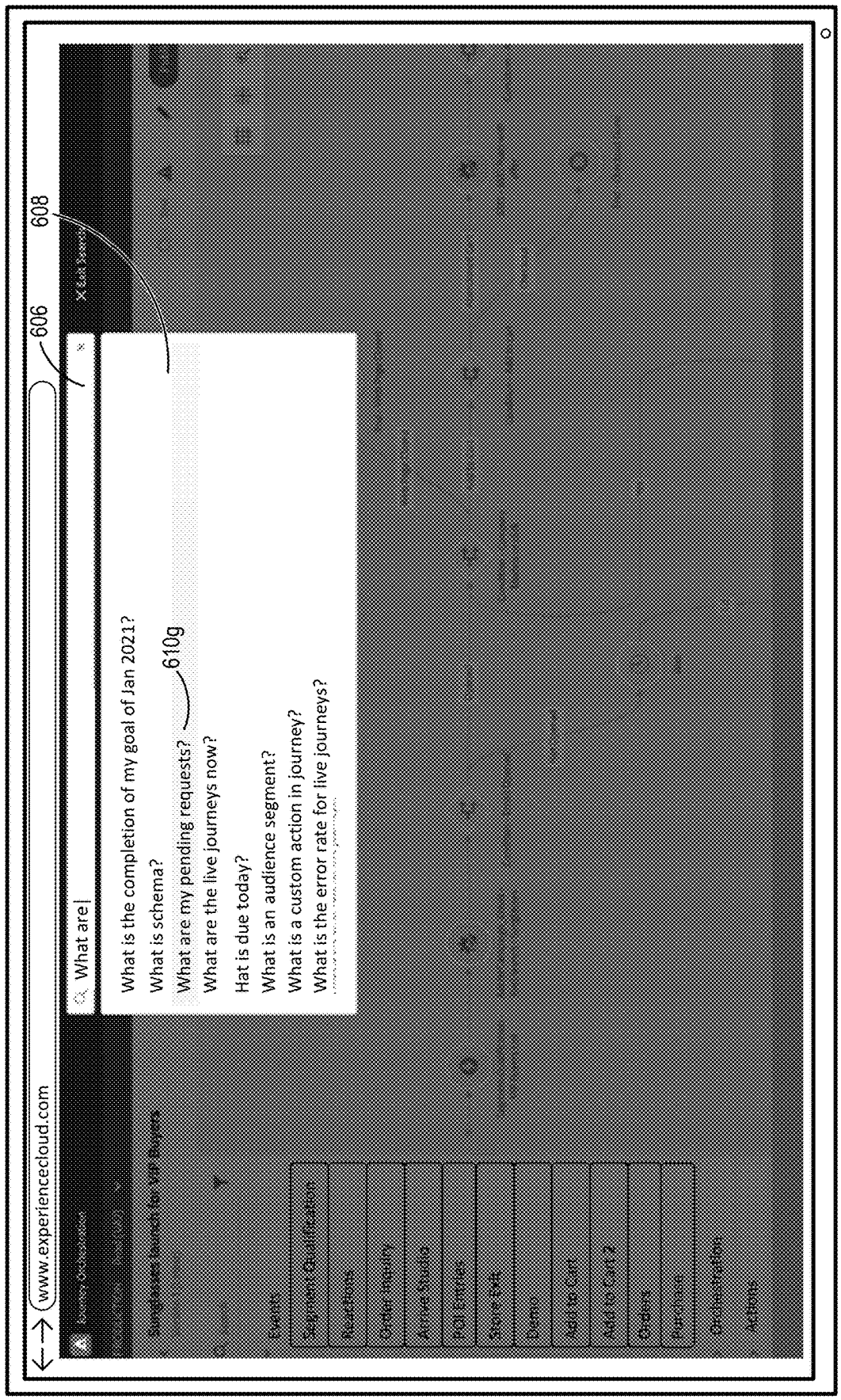
Figure 6H:
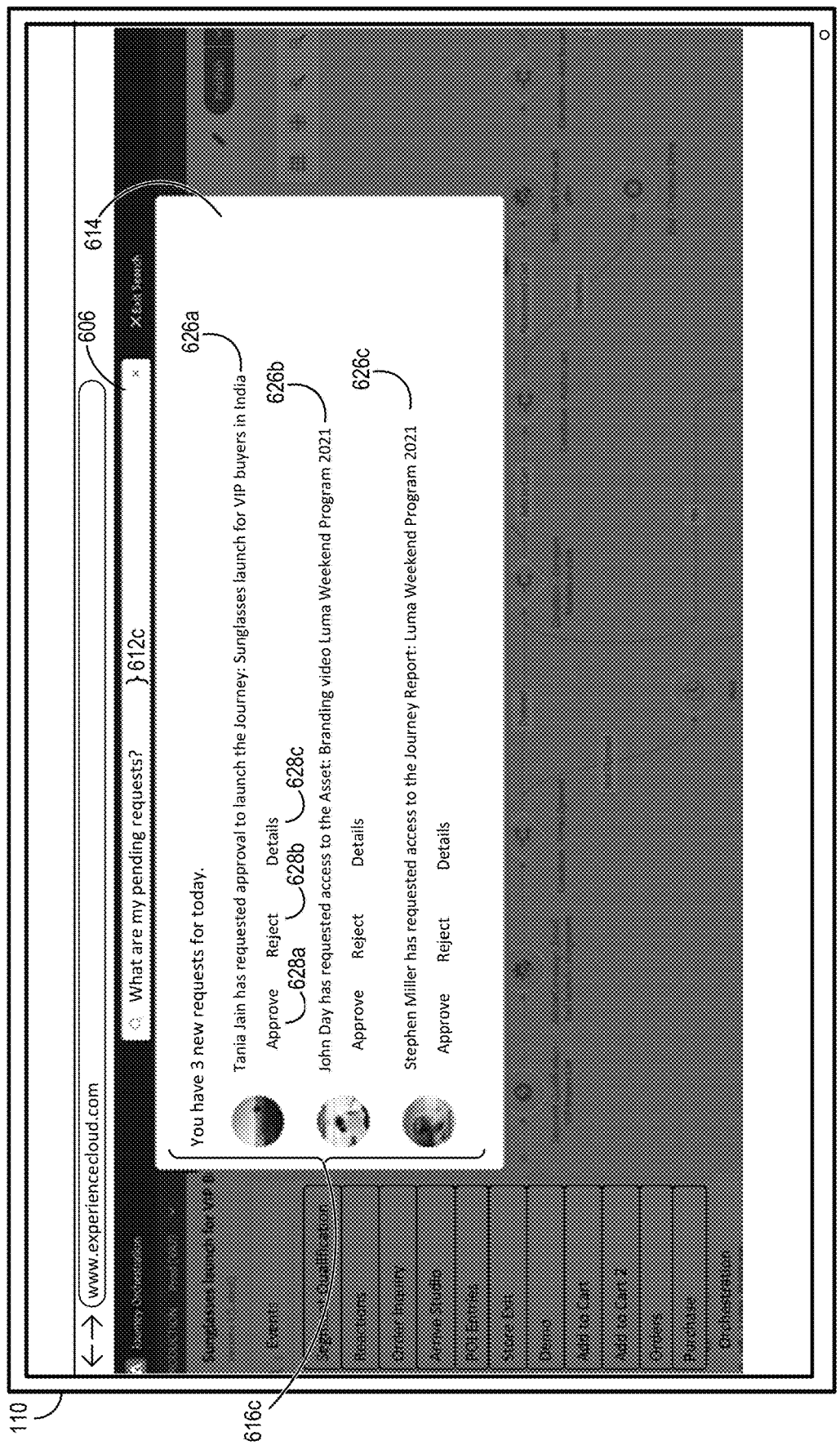

In one or more embodiments, the cross-platform search system 108 provides additional functionality within a generated response to a digital text query. For example, in response to a detected selection of the query suggestion 610g, as shown in FIG. 6G, the cross-platform search system 108 generates a platform-specific request as discussed above. Then, as shown in FIG. 6H, the cross-platform search system 108 generates the response 616c to the digital text query 612c including one or more in-place action items 626a, 626b, and 626c. In one or more embodiments, as further shown in FIG. 6H, the cross-platform search system 108 generates the in-place action items 626a-626c including one or more selectable elements 628a, 628b, 628c. For example, as discussed above, the cross-platform search system 108 generates (or causes the client device 110 to generate) the in-place action items 626a-626c, and the selectable elements 628a-628c based on instructions within one or more sections of a platform-specific configuration associated with the registered intent, "pending requests" or similar.

In response to a detected selection of any of the selectable elements 628a-628c, the cross-platform search system 108 performs one or more actions according to the platform-specific configuration. For example, in the example illustrated in FIG. 6H, the cross-platform search system 108 generates and transmits an additional request to the software platform corresponding to the platform-specific configuration to either approve or reject a pending approval, or to get additional details associated with a pending approval. To illustrate, in response to a detected selection of the selectable element 628a, the cross-platform search system 108 generates and transmits an additional request to the software platform system 114b to perform the tasks needed to approve the request associated with the in-place action item 626a.

Figure 6I:
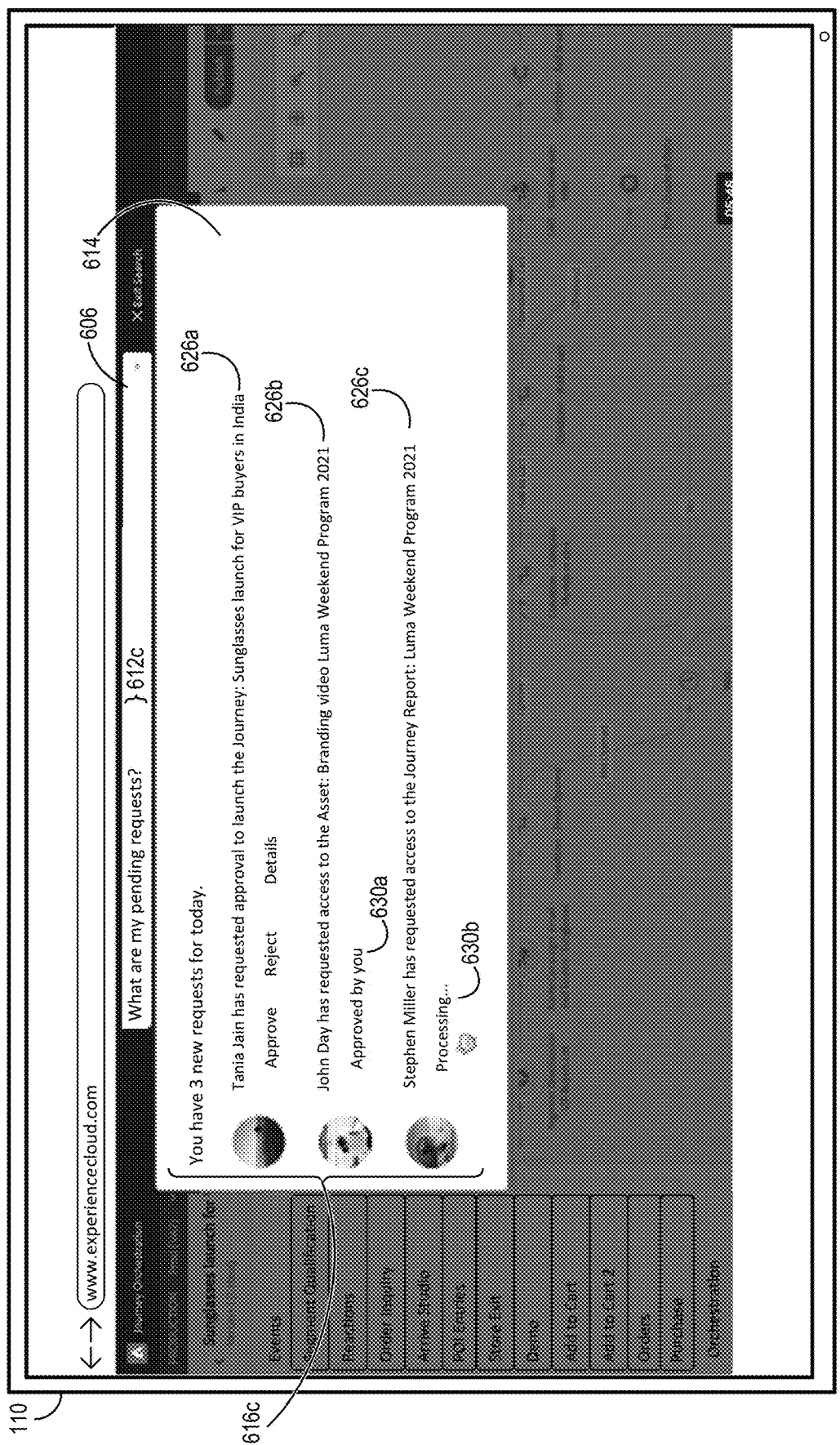

In at least one embodiment, the cross-platform search system 108 further updates the response 616c within the response rendition canvas 614 in response to: transmitting this additional request, and receiving an additional response from the software platform. For example, as shown in FIG. 6I, the cross-platform search system 108 updates the in-place action item 626b with the notification 630a (e.g., "Approved by you") in response to receiving an additional response from the software platform indicating that the additional request has been completed. Additionally, as shown in FIG. 6I, the cross-platform search system 108 updates the in-place action item 626c with the notification 630b (e.g., "Processing . . . ") in response to sending the additional request and not yet receiving an additional response from the software platform system 114b. In other words, the cross-platform search system 108 updates a selected in-place action item to reflect progress or completion of a task associated with the selected in-place action item.

Although not illustrated in FIGS. 6A-6I, the cross-platform search system 108 generates auxiliary digital text query responses in response to receiving a digital text query. For example, as discussed above, the cross-platform search system 108 utilizes platform-specific configurations to generate auxiliary platform-specific requests associated with a digital text query. To illustrate, as mentioned above, a platform-specific configuration can include an auxiliary suggestion section including additional instructions for generating one or more secondary responses to a digital text query associated with a particular registered intent—beyond main or primary instructions for generating a response to the same digital text query. For example, the auxiliary suggestion section can include URLs, additional instructions for generating platform-specific requests, fallback responses, and so forth. In response to determining that the platform-specific configuration includes an auxiliary suggestion section, the cross-platform search system 108 generates one or more additional platform-specific requests, receives additional platform-specific responses, and generate one or more auxiliary responses to the digital text query. For instance, the cross-platform search system 108 generates the one or more auxiliary responses to cause the client device 110 to display the auxiliary responses in a secondary interface. To illustrate, the cross-platform search system 108 generates the one or more auxiliary responses to cause the client device 110 to display the auxiliary responses in a side portion of the software platform application 112a, in a pop-up window of the software platform application 112a, in a footer of the software platform application 112a, etc.

Figure 7:
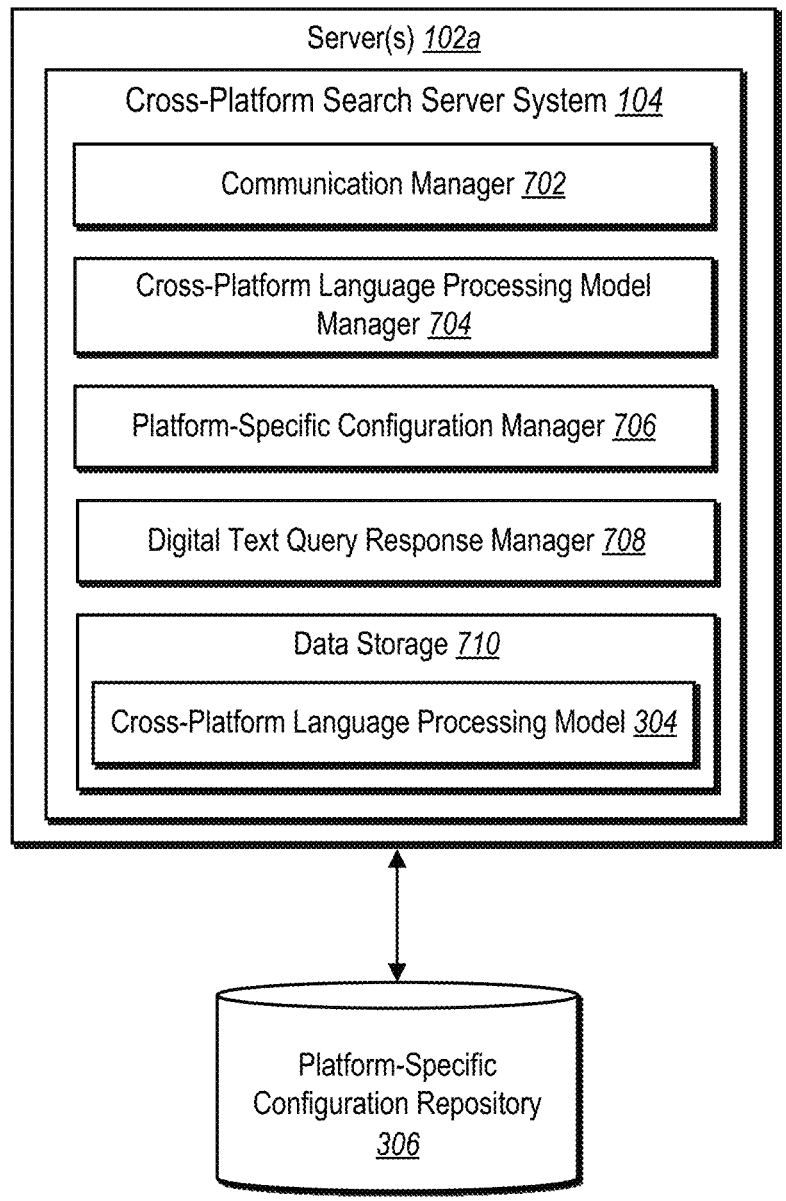
FIG. 7 illustrates a schematic diagram of a cross-platform search system in accordance with one or more embodiments.

FIG. 7 illustrates a detailed schematic diagram of an embodiment 700 of the cross-platform search server system 104 in accordance with one or more embodiments. As discussed above, the cross-platform search server system 104 is operable on a variety of computing devices. Thus, for example, the cross-platform search server system 104 is operable on the server(s) 102a (as shown in FIG. 1). Additionally or alternatively, the mirrored cross-platform search system 108 is operable on the administrator computing device 106. In one or more embodiments, the cross-platform search server system 104 (or mirrored cross-platform search system 108) includes a communication manager 702, a cross-platform language processing model manager 704, a platform-specific configuration manager 706, a digital text query response manager 708, and a data storage 710 including the cross-platform language processing model 304.

As just mentioned, and as shown in FIG. 7, the cross-platform search server system 104 includes the communication manager 702. In one or more embodiments, the communication manager 702 performs all communication tasks involved in generating responses to digital text queries received via ask interfaces (e.g., query interfaces) on client devices. For example, the communication manager 702 receives digital text queries from client devices. Additionally, the communication manager 702 transmits generated platform-specific requests to one or more software platform systems and/or gateways. For example, the communication manager 702 transmits a generated platform-specific request to an API server for further transmission to a particular software platform system. Moreover, the communication manager 702 receives responses to platform-specific requests from one or more software platform systems and/or gateways. The communication manager 702 also transmits generated responses to digital text queries to one or more client devices.

As mentioned above, and as shown in FIG. 7, the cross-platform search server system 104 includes the cross-platform language processing model manager 704. In one or more embodiments, the cross-platform language processing model manager 704 builds, trains, learns parameters of, and otherwise maintains the cross-platform language processing model 304. For example, as discussed above with reference to FIG. 4, the cross-platform language processing model manager 704 receives training data from one or more software platform systems including previous digital text queries, corresponding ground truth intents, and platform-specific configurations. In one or more embodiments, the cross-platform language processing model manager 704 utilizes this data to learn parameters of the cross-platform language processing model 304 until the cross-platform language processing model 304 accurately predicts registered intents from unknown digital text queries. Additionally, in one or more embodiments, the cross-platform language processing model manager 704 further trains the cross-platform language processing model 304 to extract or predict parameter values from digital text queries in correspondence with determined registered intents. In additional or alternatively embodiments, the cross-platform language processing model manager 704 also trains the cross-platform language processing model 304 to perform spell correction on digital text queries, to perform synonym handling in connection with digital text queries, and/or to perform semantic matching in connection with digital text queries—along with determining registered intents associated with the digital text queries.

As mentioned above, and as shown in FIG. 7, the cross-platform search server system 104 includes the platform-specific configuration manager 706. In one or more embodiments, the platform-specific configuration manager 706 enables creation of platform-specific configurations, maintains and organizes platform-specific configurations, and identifies one or more platform-specific configurations corresponding to a determined registered intent associated with a digital text query.

For example, the platform-specific configuration manager 706 enables creation of platform-specific configurations in various ways. In one embodiment, the platform-specific configuration manager 706 generates and provides one or more builder user interfaces to the administrator computing device 106. For example, the platform-specific configuration manager 706 generates and provides builder user interface that provide various selectable elements (e.g., drop-down lists, text boxes, radio buttons) that enable a user of the administrator computing device 106 to quickly and easily configure a platform-specific configuration. For instance, in response to detected selections via the provided builder user interface, the platform-specific configuration manager 706 generates a platform-specific configuration including multiple templatized sections, where each section includes instructions for generating platform-specific requests, for generating responses to digital text queries, and for generating auxiliary platform-specific requests. In one or more embodiments, the platform-specific configuration manager 706 generates the platform-specific configuration as a digital document including a known syntax and formatting associated with at least one of a scripting language (e.g., Java Script Object Notation or JSON), or other markup language (e.g., HTML, LaTeX).

Additionally, the platform-specific configuration manager 706 organizes and maintains platform-specific configurations. For example, in one embodiment, the platform-specific configuration manager 706 generates a platform-specific configuration mapping that organizes platform-specific configurations according to registered intents and associated software platforms. For instance, the platform-specific configuration manager 706 generates the platform-specific mapping as a table where registered intents are rows, software platforms are rows (or vice versa), and platform-specific configurations are mapped at the intersections of their corresponding registered intents and software platforms. Additionally or alternatively, the platform-specific configuration manager 706 generates the platform-specific configuration mapping as a hash table, ordered list, or other data structure. In at least one embodiment, the platform-specific configuration manager 706 stores the platform-specific configuration mapping in the platform-specific configuration repository 306.

Furthermore, the platform-specific configuration manager 706 identifies one or more platform-specific configurations corresponding to a determined registered intent associated with a digital text query. For example, in one embodiment, the platform-specific configuration manager 706 identifies a platform-specific configuration utilizing the platform-specific configuration mapping discussed above. To illustrate, in response to receiving a determined intent associated with a digital text query, the platform-specific configuration manager 706 utilizes the mapping to identify one or more platform-specific configurations mapped to that intent.

As mentioned above, and as shown in FIG. 7, the cross-platform search server system 104 includes the digital text query response manager 708. In one or more embodiments, the digital text query response manager 708 generates platform-specific requests, receives responses to platform-specific requests, and generates responses to digital text queries from the responses to the platform-specific requests. For example, as discussed above, the digital text query response manager 708 generates a platform-specific request by formatting one or more parameter values extracted from a digital text query and other data sources according to instructions in a platform-specific configuration selected based on a registered intent.

The digital text query response manager 708 then transmits the generated platform-specific request to an answer provider defined in the platform-specific configuration to receive a response to the platform-specific request. In one or more embodiments, as discussed above, the digital text query response manager 708 receives the response to the platform-specific request as raw data (e.g., a comma delimited text file of datapoints). In at least one embodiment, the digital text query response manager 708 then generates or determines display instructions from the platform-specific configuration including one or more response rendition types. The digital text query response manager 708 generates the response to the digital text query including the display instructions and the raw data, and transmits the response to the digital text query to the client device 110 to cause the client device 110 to render a display of the raw data according to the display instructions.

Each of the components 702-710 of the cross-platform search server system 104 (or the mirrored cross-platform search system 108) includes software, hardware, or both. For example, the components 702-710 includes one or more instructions stored on a computer-readable storage medium and executable by processors of one or more computing devices, such as a client computing device or server device. When executed by the one or more processors, the computer-executable instructions of cross-platform search server system 104 causes the computing device(s) to perform the methods described herein. Alternatively, the components 702-710 includes hardware, such as a special-purpose processing device to perform a certain function or group of functions. Alternatively, the components 702-710 of the cross-platform search server system 104 includes a combination of computer-executable instructions and hardware.

Furthermore, the components 702-710 of the cross-platform search server system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-710 may be implemented as a stand-alone application, such as a desktop or mobile application. Furthermore, the components 702-710 may be implemented as one or more web-based applications hosted on a remote server. The components 702-710 may also be implemented in a suite of mobile device applications or "apps." To illustrate, the components 702-710 may be implemented in an application, including but not limited to ADOBE ANALYTICS CLOUD, ADOBE ANALYTICS, ADOBE AUDIENCE MANAGER, ADOBE CAMPAIGN, ADOBE EXPERIENCE MANAGER, ADOBE TARGET, ADOBE CUSTOMER JOURNEY ANALYTICS, ADOBE CREATIVE CLOUD, ADOBE PHOTOSHOP, AND ADOBE ILLUSTRATOR. The foregoing are either registered trademarks or trademarks of Adobe Systems Incorporated in the United States and/or other countries.

Figure 8:
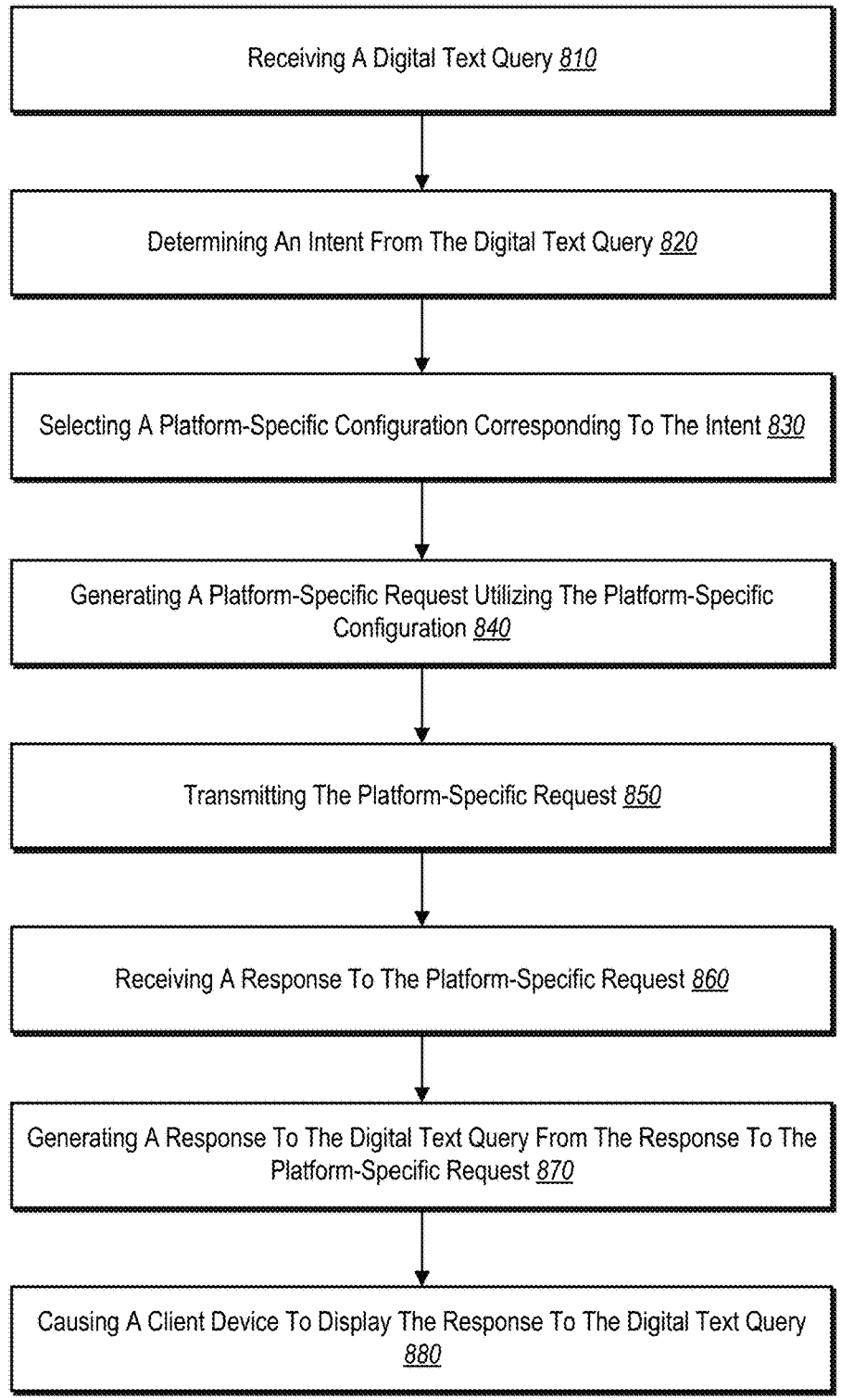
FIG. 8 illustrates a flowchart of a series of acts for generating a platform-specific request to a digital text query in accordance with one or more embodiments in accordance with one or more embodiments.

FIGS. 1-7, the corresponding text, and the examples provide a number of different methods, systems, devices, and non-transitory computer-readable media of the cross-platform search system 108. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for generating a platform-specific request to a digital text query in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of receiving a digital text query. In particular, the act 810 involves receiving, via a query interface of a client device, a digital text query for information from a software platform. More particularly, the act 810 can involve receiving, via a query interface of a second software platform of a client device, a digital text query for information from a first software platform.

In one or more embodiments, the series of acts 800 includes an act of registering a software platform by receiving a platform-specific configuration corresponding to the software platform, previous digital text queries for information from the software platform, and ground truth intents for the previous digital text queries for information from the software platform. Additionally, in at least one embodiment, the series of acts 800 includes an act of building the cross-platform language processing model by: generating predicted intents from the previous digital text queries utilizing the cross-platform language processing model; and utilizing comparison results between the predicted intents and the ground truth intents to modify parameters of the cross-platform language processing model. For example, building the cross-platform language processing model is further from previous digital text queries for information from an additional software platform and additional ground truth intents for the previous digital text queries for information from the additional software platform.

As shown in FIG. 8, the series of acts 800 includes an act 820 of determining an intent from the digital text query. In particular, the act 820 involves determining, utilizing a cross-platform language processing model, at least one intent from the digital text query. For example, in one or more embodiments, the act 820 includes utilizing the cross-platform language processing model to generate the at least one intent from the digital text query by utilizing the cross-platform language processing model to generate a classification probability indicating a likelihood that the digital text query comprises a particular registered intent.

As shown in FIG. 8, the series of acts 800 includes an act 830 of selecting a platform-specific configuration corresponding to the intent. In particular, the act 830 involves selecting, utilizing the at least one intent, a platform-specific configuration corresponding to the software platform from a plurality of platform-specific configurations. More particularly, the act 830 can involve selecting, utilizing the at least one intent, a platform-specific configuration corresponding to the first software platform from the plurality of platform-specific configurations specific to the first software platform. For example, selecting, utilizing the at least one intent, the platform-specific configuration corresponding to the software platform from the plurality of platform-specific configurations by: determining a matching score for the at least one intent that reflects a classification probability that the at least one intent corresponds with at least one registered intent from a plurality of registered intents; and determining the platform-specific configuration based on the matching score for the at least one intent satisfying a first threshold range. For example, selecting the platform-specific configuration corresponding to the first software platform can include selecting, based on the classification probability being within a first threshold range and from within the platform-specific configuration mapping, the platform-specific configuration based on the particular registered intent and the first software platform.

In one or more embodiments, the series of acts 800 includes generating a platform-specific configuration mapping that organizes the plurality of platform-specific configurations specific to the first software platform according to: one or more registered intents referenced by the plurality of platform-specific configurations specific to the first software platform, and the first software platform. In at least one embodiment, the series of acts 800 includes updating the platform-specific configuration mapping with a plurality of platform-specific configurations associated with the second software platform according to: one or more registered intents referenced by the plurality of platform-specific configurations specific to the second software platform, and the second software platform.

As shown in FIG. 8, the series of acts 800 includes an act 840 of generating a platform-specific request utilizing the platform-specific configuration. In particular, the act 840 involves generating a platform-specific request utilizing the at least one intent and the platform-specific configuration. More specifically, the act 840 can involve generating, utilizing the at least one intent and the platform-specific configuration, a platform-specific request for transmission to a server device corresponding to the first software platform. For example, generating the platform-specific request utilizing the at least one intent and the platform-specific configuration includes: extracting one or more parameter values from the digital text query according to parameters of the platform-specific configuration; and generating the platform-specific request referencing the one or more parameter values in a format specified by the platform-specific configuration.

In one or more embodiments, the series of acts 800 includes identifying an auxiliary suggestion section of the platform-specific configuration, and generating an auxiliary platform-specific request utilizing the auxiliary suggestion section of the platform-specific configuration. The series of acts 800 further includes transmitting the auxiliary platform-specific request to the server device corresponding to the software platform, and generating, from a response to the auxiliary platform-specific request, an auxiliary response to the digital text query to provide for display via a secondary interface of the client device.

In one or more embodiments, the series of acts 800 involve identifying a response rendition type from the platform-specific configuration based on the at least one intent. For example, the series of acts 800 can include determining a response rendition type for the response to the digital text query from the platform-specific configuration, and causing the client device to display the response to the digital text query by transmitting the response to the digital text query and the response rendition type to the client device such that the client device to render the response to the digital text query within the query interface of the client device according to the response rendition type.

As shown in FIG. 8, the series of acts 800 includes an act 850 of transmitting the platform-specific request. In particular, the act 850 involves transmitting the platform-specific request to a server device corresponding to the software platform. For example, the act 850 can include transmitting the response to the digital text query to the client device such that the client device renders the response to the digital text query by expanding the query interface into a response rendition canvas and rendering the response to the digital text query withing the response rendition canvas according to at least one of a table response rendition type, a reporting chart response rendition type, or a list response rendition type. For instance, in one or more embodiments, transmitting the response to the digital text query to the client device further includes the client device to render the response to the digital text query by including one or more in-place actions within one of a table, a reporting chart, or a list.

As shown in FIG. 8, the series of acts 800 includes an act 860 of receiving a response to the platform-specific request. In particular, the act 860 involves receiving a response to the platform-specific request from the server device corresponding to the software platform. Additionally, as shown in FIG. 8, the series of acts 800 includes an act 870 of generating a response to the digital text query from the response to the platform-specific request. In particular, the act 870 involves generating a response to the digital text query from the response to the platform-specific request. In some embodiments, the act 870 involves generating, from a response to the platform-specific request, a response to the digital text query by combining the response to the platform-specific request and the response rendition type.

As shown in FIG. 8, the series of acts 800 includes an act 880 of causing a client device to display the response to the digital text query. In particular, the act 880 involves causing the client device to display, via the query interface, the response to the digital text query. More specifically, the act 880 can involve causing the client device to render the response the response to the digital text query according to the response rendition type by: expanding the query interface of the second software platform into a response rendition canvas; and rendering the response to the digital text query according to the response rendition type within the response rendition canvas. For example, rendering the response to the digital text query according to the response rendition type within the response rendition canvas can include rendering the response to the digital text query according to at least one of a table response rendition type, a reporting chart response rendition type, or a list response rendition type. Additionally, in one or more embodiments, rendering the response to the digital text query according to the response rendition type within the response rendition canvas further includes rendering the response to the digital text query including one or more in-place actions within the response rendition canvas.

In one or more embodiments, the series of acts 800 includes receiving, in response to causing the client device to display the response to the digital text query, feedback information associated with the response to the digital text query; and further building the cross-platform language processing model from the feedback information. Additionally, in one or more embodiments, the series of acts 800 includes generating, in response to a detected selection of an in-place action of the one or more in-place actions, an additional platform-specific request based on the selected in-place action and utilizing the platform-specific configuration; and updating, in response to transmitting the additional platform-specific request to the first software platform, the response rendition canvas. Furthermore, in at least one embodiment, the series of acts 800 includes updating the response rendition canvas in response to a detected selection of an in-place action of the one or more in-place actions to reflect progress or completion of a task associated with the selected in-place action by the software platform.

In the alternative to the acts described above, in some embodiments, the cross-platform search system 108 performs a step for generating a platform-specific request from a platform-specific configuration corresponding to the at least one intent. In particular, the algorithm and acts described above in relation to FIGS. 2-5 comprises the acts (or structure) corresponding to a step for generating a platform-specific request from a platform-specific configuration corresponding to the at least one intent.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
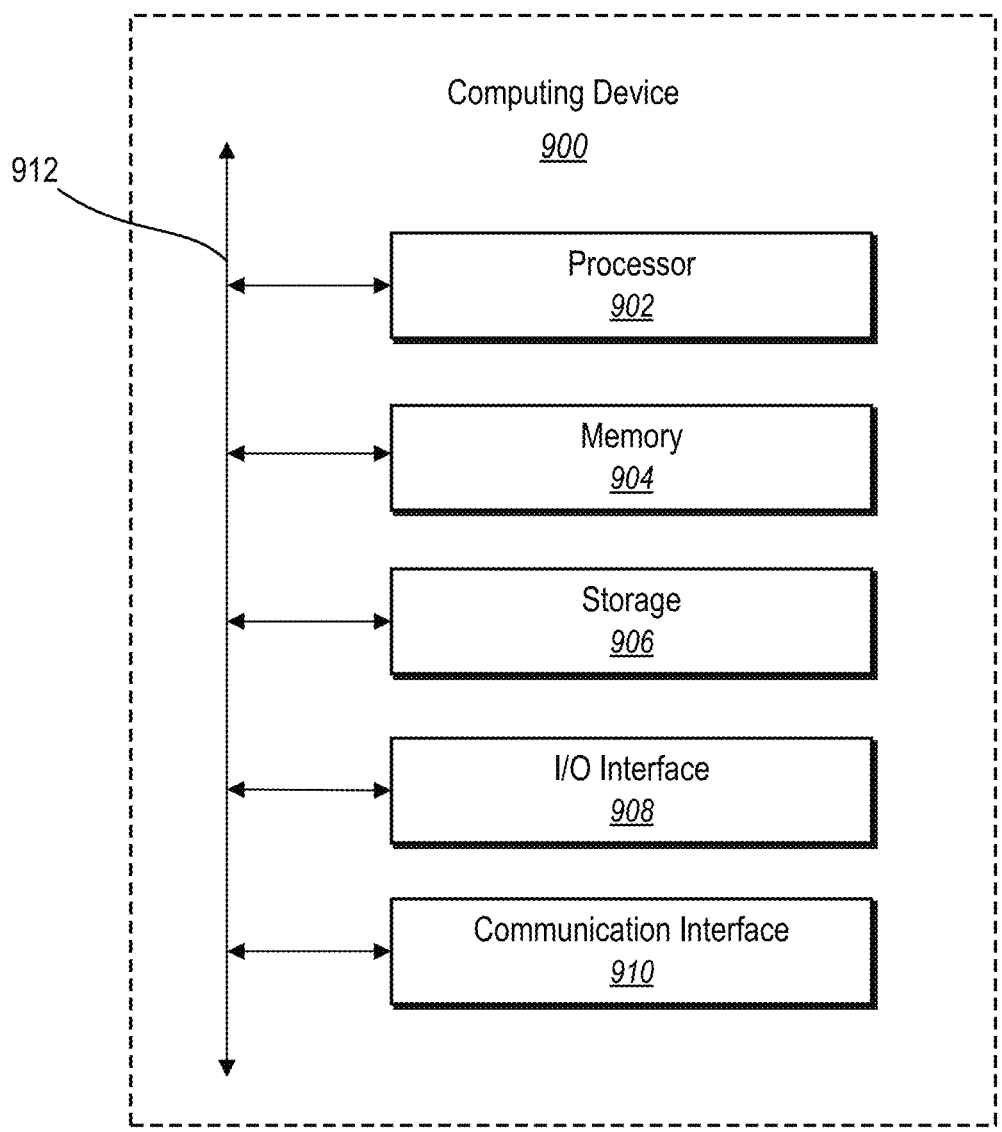
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102a, 102b, 102c, the client device 110, the administrator client device 106). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client computing device). Further, the computing device 900 may be a server device that includes cloud-based processing and storage capabilities.

As shown in FIG. 9, the computing device 900 includes one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 includes a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 includes hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 includes hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to:
    register a plurality of software platforms to identify intents corresponding to the plurality of software platforms by training a cross-platform language processing model with:
        a first set of previous digital text queries for a first software platform, a first set of ground truth intents for the first software platform, and a first set of platform-specific configurations for the first software platform; and
        a second set of previous digital text queries for a second software platform, a second set of ground truth intents for the second software platform, and a second set of platform-specific configurations for the second software platform;
    receive, via a query interface of a client device, a digital text query for information from a software platform;
    determine, utilizing the cross-platform language processing model trained for the plurality of software platforms, at least one intent from the digital text query;
    select, utilizing the at least one intent, a plurality of platform-specific configurations corresponding to a plurality of software platforms;
    generate a plurality of platform-specific requests utilizing the at least one intent and the plurality of platform-specific configurations;
    transmit the plurality of platform-specific requests to the plurality of software platforms;
    receive a plurality of responses to the plurality of platform-specific requests from the plurality of software platforms;
    generate a response to the digital text query from the plurality of responses to the plurality of platform-specific requests; and
    cause the client device to display, via the query interface, the response to the digital text query.

2. The non-transitory computer-readable storage medium as recited in claim 1, further comprising instructions that, when executed by the at least one processor, cause the computing device to train the cross-platform language processing model with a third set of previous digital text queries for a third software platform a third set of ground truth intents for the third software platform, and a third set of platform-specific configurations for the third software platform.

3. The non-transitory computer-readable storage medium as recited in claim 2, further comprising instructions that, when executed by the at least one processor, cause the computing device to build the cross-platform language processing model by:
   generating predicted intents from the third set of previous digital text queries utilizing the cross-platform language processing model; and
   utilizing comparison results between the predicted intents and the third set of ground truth intents to modify parameters of the cross-platform language processing model.

4. The non-transitory computer-readable storage medium as recited in claim 3, further comprising instructions that, when executed by the at least one processor, cause the computing device to modify the parameters of the cross-platform language processing model until a threshold convergence value is satisfied.

5. The non-transitory computer-readable storage medium as recited in claim 4, further comprising instructions that, when executed by the at least one processor, cause the computing device to:
   receive, in response to causing the client device to display the response to the digital text query, feedback information associated with the response to the digital text query; and
   further build the cross-platform language processing model from the feedback information.

6. The non-transitory computer-readable storage medium as recited in claim 1, further comprising instructions that, when executed by the at least one processor, cause the computing device to select, utilizing the at least one intent, the plurality of platform-specific configurations corresponding to the plurality of software platforms by:
   determining a matching score for the at least one intent that reflects a classification probability that the at least one intent corresponds with at least one registered intent from a plurality of registered intents; and
   determining the plurality of platform-specific configurations based on the matching score for the at least one intent satisfying a first threshold range.

7. The non-transitory computer-readable storage medium as recited in claim 6, further comprising instructions that, when executed by the at least one processor, cause the computing device to:
   identify an auxiliary suggestion section of the plurality of platform-specific configurations;
   generate an auxiliary platform-specific request utilizing the auxiliary suggestion section of the plurality of platform-specific configurations;
   transmit the auxiliary platform-specific request to the plurality of software platforms; and
   generate, from a response to the auxiliary platform-specific request, an auxiliary response to the digital text query to provide for display via a secondary interface of the client device.

8. The non-transitory computer-readable storage medium as recited in claim 1, further comprising instructions that, when executed by the at least one processor, cause the computing device to generate the plurality of platform-specific requests utilizing the at least one intent and the plurality of platform-specific configurations by:
   extracting one or more parameter values from the digital text query according to parameters of the plurality of platform-specific configurations; and
   generating the plurality of platform-specific requests referencing the one or more parameter values in a format specified by the plurality of platform-specific configurations.

9. The non-transitory computer-readable storage medium as recited in claim 1, further comprising instructions that, when executed by the at least one processor, cause the computing device to:
   determine a response rendition type for the response to the digital text query from the plurality of platform-specific configurations; and
   cause the client device to display the response to the digital text query by transmitting the response to the digital text query and the response rendition type to the client device such that the client device renders the response to the digital text query within the query interface of the client device according to the response rendition type.

10. A system comprising:
   at least one computer memory device comprising:
   a cross-platform language processing model, and
   a plurality of platform-specific configurations corresponding to a plurality of software platforms and referencing a plurality of registered intents; and
   one or more servers configured to cause the system to:
   register the plurality of software platforms to identify intents corresponding to the plurality of software platforms by training the cross-platform language processing model with:
      a first set of previous digital text queries for a first software platform, a first set of ground truth intents for the first software platform, and a first set of platform-specific configurations for the first software platform; and
      a second set of previous digital text queries for a second software platform, a second set of ground truth intents for the second software platform, and a second set of platform-specific configurations for the second software platform;
   receive, via a query interface of a software platform of a client device, a digital text query for information;
   utilize the cross-platform language processing model trained for the plurality of software platforms to determine at least one intent from the digital text query;
   select, utilizing the at least one intent, a subset of platform-specific configurations for a subset of software platforms from the plurality of platform-specific configurations corresponding to the plurality of software platforms;
   identify a plurality of response rendition types from the subset of platform-specific configurations based on the at least one intent;
   generate, utilizing the at least one intent and the plurality of platform-specific configurations, a plurality of platform-specific requests for transmission to the subset of software platforms; and
   generate, from a plurality of responses to the plurality of platform-specific requests, a response to the digital text query by combining the plurality of responses to the plurality of platform-specific requests and the plurality of response rendition types.

11. The system as recited in claim 10, wherein the one or more servers are further configured to cause the system to transmit the response to the digital text query and the plurality of response rendition types to cause the client device to render the response to the digital text query according to the plurality of response rendition types by:
expanding the query interface of the software platform into a response rendition canvas; and
rendering the response to the digital text query according to the plurality of response rendition types within the response rendition canvas.

12. The system as recited in claim 11, wherein rendering the response to the digital text query according to the plurality of response rendition types within the response rendition canvas comprises rendering the response to the digital text query according to at least one of a table response rendition type, a reporting chart response rendition type, or a list response rendition type.

13. The system as recited in claim 12, wherein rendering the response to the digital text query according to the plurality of response rendition types within the response rendition canvas further comprises rendering the response to the digital text query including one or more in-place actions within the response rendition canvas.

14. The system as recited in claim 13, wherein the one or more servers are further configured to cause the system to:
generate, in response to a detected selection of an in-place action of the one or more in-place actions, an additional platform-specific request based on the selected in-place action and utilizing the subset of platform-specific configurations; and
update, in response to transmitting the additional platform-specific request to the subset of software platforms, the response rendition canvas.

15. The system as recited in claim 10, wherein the one or more servers are further configured to generate a platform-specific configuration mapping that organizes the plurality of platform-specific configurations specific to the first software platform according to: one or more registered intents referenced by the plurality of platform-specific configurations specific to the first software platform, and the first software platform.

16. The system as recited in claim 15, wherein the one or more servers are further configured to update the platform-specific configuration mapping with a plurality of platform-specific configurations associated with the second software platform according to: one or more registered intents referenced by the plurality of platform-specific configurations specific to the second software platform, and the second software platform.

17. The system as recited in claim 16, wherein the one or more servers are further configured to cause the system to:
utilize the cross-platform language processing model to generate the at least one intent from the digital text query by utilizing the cross-platform language processing model to generate a classification probability indicating a likelihood that the digital text query comprises a particular registered intent; and
select the plurality of platform-specific configurations corresponding to the first software platform by selecting, based on the classification probability being within a first threshold range and from within the platform-specific configuration mapping, the plurality of platform-specific configurations based on the particular registered intent and the first software platform.

18. A computer-implemented method comprising:
generating, utilizing a cross-platform language processing model trained for a plurality of software platforms, at least one intent from a digital text query for information from a software platform, wherein the digital text query is received via a query interface of a client device;
generating a plurality of platform-specific requests from a plurality of platform-specific configurations corresponding to the at least one intent by:
registering the plurality of software platforms to identify intents corresponding to the plurality of software platforms by training the cross-platform language processing model with:
a first set of previous digital text queries for a first software platform, a first set of ground truth intents for the first software platform, and a first set of platform-specific configurations for the first software platform; and
a second set of previous digital text queries for a second software platform, a second set of ground truth intents for the second software platform, and a second set of platform-specific configurations for the second software platform;
generating, from the plurality of platform-specific requests, a plurality of responses to the digital text query; and
transmitting the plurality of responses to the digital text query to the client device such that the client device renders the plurality of responses to the digital text query by expanding the query interface into a response rendition canvas and rendering the plurality of responses to the digital text query within the response rendition canvas according to at least one of a table response rendition type, a reporting chart response rendition type, or a list response rendition type.

19. The computer-implemented method as recited in claim 18, wherein transmitting the plurality of responses to the digital text query to the client device further causes the client device to render the plurality of responses to the digital text query by including one or more in-place actions within one of a table, a reporting chart, or a list.

20. The computer-implemented method as recited in claim 19, further comprising updating the response rendition canvas in response to a detected selection of an in-place action of the one or more in-place actions to reflect progress or completion of a task associated with the selected in-place action by the software platform.

* * * * *